United States Patent [19]
Kato et al.

[11] Patent Number: 5,721,800
[45] Date of Patent: Feb. 24, 1998

[54] DISPERSION-SHIFTED FIBER

[75] Inventors: Takatoshi Kato; Yoshiyuki Suetsugu; Masayuki Nishimura, all of Yokohama, Japan

[73] Assignee: Sumitomo Electric Industries, Ltd., Osaka, Japan

[21] Appl. No.: 785,837

[22] Filed: Jan. 15, 1997

[30] Foreign Application Priority Data

Jan. 16, 1996 [JP] Japan ................... 8-004947

[51] Int. Cl.$^6$ ................................. G02B 6/10
[52] U.S. Cl. .................. 385/127; 385/141; 385/142; 385/144
[58] Field of Search ..................... 385/123, 126, 385/127, 122, 141, 142, 144

[56] References Cited

U.S. PATENT DOCUMENTS

| | | | |
|---|---|---|---|
| 4,755,022 | 7/1988 | Ohashi et al. | 350/96.33 |
| 4,852,968 | 8/1989 | Reed | 350/96.33 |
| 4,913,521 | 4/1990 | Tajima et al. | 350/96.33 |
| 5,298,047 | 3/1994 | Hart, Jr. et al. | 65/3.11 |
| 5,327,516 | 7/1994 | Chraplyvy et al. | 385/123 |
| 5,483,612 | 1/1996 | Gallagher et al. | 385/127 |
| 5,504,829 | 4/1996 | Evans et al. | 385/123 |
| 5,568,583 | 10/1996 | Akasaka et al. | 385/123 |

FOREIGN PATENT DOCUMENTS

| | | |
|---|---|---|
| 0 249 230 | 12/1987 | European Pat. Off. . |
| 2 586 823 | 3/1987 | France . |
| 2-141704 | 5/1990 | Japan . |
| 83/00232 | 1/1983 | WIPO . |

OTHER PUBLICATIONS

Namihira, "Relationship Between Nonlinear Effective Area and Modefield Diameter for Dispersion Shifted Fibres", Electronics Letters, vol. 30, No. 33, Feb. 1994, pp. 262–264.

Ogai et al, "Development and Performance of Fully Fluorine–Doped Single–Mode Fibers", Journal of Lightwave Technology, vol. 6, No. 10, Oct. 1988.

Tewari et al, "Dispersion–Shifted Dual–Shape Core Fibers: Optimization Based on Spot Size Definitions", Journal of Lightwave Technology, vol. 10, No. 1, Jan. 1992, pp. 1–5.

*Primary Examiner*—John Ngo
*Attorney, Agent, or Firm*—Cushman Darby & Cushman IP Group of Pillsbury Madison & Sutro LLP

[57] ABSTRACT

The present invention relates to a dispersion-shifted fiber having a structure for effectively lowering polarization-mode dispersion. This dispersion-shifted fiber is a single-mode optical fiber mainly composed of silica glass and has a zero-dispersion wavelength set within the range of at least 1.4 μm but not longer than 1.7 μm. In particular, at least the whole core region of the dispersion-shifted fiber contains fluorine.

8 Claims, 19 Drawing Sheets

Fig. 16

| $\Delta n_3$ \ C | 24 μm | 42 μm | 90 μm |
|---|---|---|---|
| 0.005% | 1571 | 1575 | 1579 |
| 0.05% | 1576 | 1580 | 1584 |
| 0.8% | 1581 | 1585 | 1589 |

ZERO-DISPERSION WAVELENGTH: nm

Fig. 17

| $\Delta n_3$ \ C | 30 μm | 42 μm | 60 μm |
|---|---|---|---|
| 0.01% | 1574 | 1577 | 1579 |
| 0.05% | 1578 | 1580 | 1582 |
| 0.10% | 1579 | 1581 | 1583 |

ZERO-DISPERSION WAVELENGTH: nm

Fig. 18

| $\Delta n_3$ \ C | 24 μm | 42 μm | 90 μm |
|---|---|---|---|
| 0.005% | 0.49 | 0.38 | 0.48 |
| 0.05% | 0.32 | 0.15 | 0.39 |
| 0.8% | 0.43 | 0.33 | 0.45 |

POLARIZATION-MODE DISPERSION: $ps/(km)^{1/2}$

Fig. 19

| $\Delta n_3$ \ C | 30 μm | 42 μm | 60 μm |
|---|---|---|---|
| 0.01% | 0.24 | 0.19 | 0.24 |
| 0.05% | 0.16 | 0.15 | 0.20 |
| 0.10% | 0.22 | 0.16 | 0.23 |

POLARIZATION-MODE DISPERSION: $ps/(km)^{1/2}$

DISPERSION-SHIFTED FIBER

BACKGROUND OF THE INVENTION

1. Field of the Invention

The present invention relates to a dispersion-shifted fiber whose zero-dispersion wavelength is set within the range of 1.4 μm to 1.7 μm.

2. Related Background Art

Conventionally, an optical fiber with a predetermined outer diameter has been produced by a method in which an optical fiber preform is drawn while an end thereof is heated and softened. In thus obtained optical fiber, however, the cross section of the core portion and its surrounding cladding portion becomes a slightly ellipsoidal or distorted circular form, making it difficult to attain a perfectly circular concentric form. Accordingly, the refractive index distribution of thus obtained optical fiber in its diameter direction is not perfectly concentric, thereby increasing polarization-mode dispersion (PMD). Here, "polarization-mode dispersion" refers to a dispersion which occurs due to a difference in group velocity between two polarizations which are orthogonal to each other in a cross section of an optical fiber.

The influence of the above-mentioned polarization-mode dispersion is strong in the case of optical fibers used for submarine cables or main-line cables where transmission with a large capacity for a long distance is necessary.

FIG. 1 shows a structure of a typical conventional dispersion-shifted fiber and its refractive index profile. As shown in FIG. 1, a conventional dispersion-shifted fiber 50, which is a single-mode (SM) optical fiber mainly composed of silica glass, comprises an inner core 910 doped with germanium (Ge), whose relative refractive index difference with respect to pure silica glass is 1.0% and whose outer diameter a is 2.6 μm; an outer core 920 which is disposed around the outer periphery of the inner core 910 and doped with Ge, whose relative refractive index difference with respect to pure silica glass is 0.08% and whose outer diameter b is 8.7 μm; and a cladding disposed around the outer periphery of the outer core 920, which is substantially made of pure silica glass and whose outer diameter is 125 μm. Here, ratio $R_a$ (=a/b) of the outer diameter a of the inner core 910 to the outer diameter b of the outer core 920 is 0.3.

The axis of abscissa of a refractive index profile 10 shown in FIG. 1 corresponds to each position on line L1 in a cross section (plane perpendicular to the advancing direction of signal light propagated therethrough) of the dispersion-shifted fiber 50. Further, in the refractive index profile 10, regions 911, 921, and 931 respectively correspond to the relative refractive index differences on the line L1 of parts in the inner core 910, outer core 920, and cladding 930.

The inventors have confirmed that, when a plurality of the dispersion-shifted fibers 50 shown in FIG. 1 are made, their mean polarization-mode dispersion becomes about 1.20 ps/(km)$^{1/2}$. In order to reduce the influence of such a polarization-mode dispersion, there has been proposed a method of making an optical fiber comprising the steps of drawing an optical fiber preform, applying a predetermined coating material to the resulting optical fiber, and guiding the optical fiber with a guide roller whose axis of rotation periodically swings, thereby imparting a predetermined torsion to the optical fiber (see Japanese Patent Application Laid-Open No. 6-171970).

Also, there has been proposed a method of making an optical fiber in which an optical fiber preform is drawn with a rotation so as to impart a predetermined torsion to the resulting optical fiber, while a predetermined coating material is applied to the optical fiber (see PCT/GB82/00200).

SUMMARY OF THE INVENTION

The inventors have studied the above-mentioned conventional methods of making an optical fiber for reducing the influence of polarization-mode dispersion and, as a result, have found the following problems to be overcome.

Namely, in the optical fiber manufactured by the conventional methods, a torsional stress remains in its coating portion. Accordingly, thus obtained optical fiber maintains its linear form in a state where a tension is imparted thereto in a traveling direction (longitudinal direction of the optical fiber) of light. In a state where the above-mentioned tension imparted thereto is removed, however, the optical fiber itself is deformed by the torsion remaining in the coating portion.

Accordingly, at a concentrating processing or the like for the optical fiber, in order to prevent the optical fiber from breaking due to a concentrating dice or the like, a certain tension is needed to be always imparted to the optical fiber along its longitudinal direction. It may become a practically serious demerit in the step of making the optical fiber, in particular.

It is an object of the present invention to provide a dispersion-shifted fiber having a structure which enables reduction of polarization-mode dispersion without imparting a torsional stress to the resulting optical fiber.

The dispersion-shifted fiber according to the present invention is a single-mode optical fiber which is mainly composed of silica glass and has a zero-dispersion wavelength within the range of at least 1.4 μm but not longer than 1.7 μm. This dispersion-shifted fiber comprises an inner core doped with at least fluorine (F), having a first refractive index and a first outer diameter a; an outer core disposed around the outer periphery of the inner core and doped with at least fluorine, having a second refractive index lower than the first refractive index and a second outer diameter b; an inner cladding disposed around the outer periphery of the outer core, having a third refractive index lower than the second refractive index; and an outer cladding disposed around the outer periphery of the inner cladding, having a fourth refractive index higher than the third refractive index.

Namely, in the dispersion-shifted fiber according to the present invention, fluorine is added to, at least, its core region (including the inner and outer cores; see FIG. 11). Also, in the refractive index profile of the dispersion-shifted fiber, a depression is formed at a part corresponding to a glass region positioned outside of the core region, for example, as shown in FIG. 3. In the dispersion-shifted fiber, fluorine is preferably added to the inner cladding as well.

While the light advancing through the dispersion-shifted fiber successively extends to the inner core, outer core, and cladding as being propagated through the dispersion-shifted fiber in its longitudinal direction; the density of intensity of the light is highest in the inner core and successively decreases in the outer core and the cladding. On the other hand, in the step of manufacturing a dispersion-shifted fiber, a predetermined control is effected such that the inner core, the outer core, and the cladding have cross sections respectively approximating perfect circles. Nevertheless, it becomes harder to attain a perfect circle as the outer diameter is smaller (in a glass region closer to the optical axis of the dispersion-shifted fiber). In particular, the inner core cannot be prevented from having an ellipsoidal cross section which is distorted to a certain extent or more.

According to the findings of the inventors, the non-circularity of the cross section of the inner core (which refers to the degree of distortion of the cross section with respect to a complete circle and is given by the ratio of the maximum diameter and the minimum diameter of the cross section, these diameters being line segments orthogonal to the optical axis of the dispersion-shifted fiber in this specification) is particularly influenced by the light traveling near the optical axis. Such light is greatly influenced by the non-circularity of the inner core and generates a large polarization-mode dispersion in a long-distance transmission. By contrast, it has been known that light traveling through a region distanced from the inner core is influenced less by the non-circularity of the inner core, whereby a large polarization-mode dispersion is hard to occur. Accordingly, as the degree of extension of light in the dispersion-shifted fiber in its diameter direction is greater, the polarization-mode dispersion becomes smaller when the whole light traveling through the dispersion-shifted fiber (including light components respectively advancing near the optical axis and the region distanced from the inner core) is taken into consideration.

Also, the zero-dispersion wavelength of the dispersion-shifted fiber having a double core structure is mainly determined by its refractive index profile. The inventors have compared a conventional dispersion-shifted fiber having a predetermined refractive index profile with a dispersion-shifted fiber which has a refractive index profile of the same form as that of the conventional dispersion-shifted fiber and in which both inner core and outer core are doped with fluorine, and have found out that the polarization-mode dispersion is reduced more in the dispersion-shifted fiber having a core region doped with fluorine.

The dispersion-shifted fiber according to the present invention adopts a "double-core+double-cladding" structure. Then, under the restriction of 1.4 μm≦ zero-dispersion wavelength $\lambda_0$≦1.7 μm, the refractive index of the inner cladding is made lower than that of the outer cladding (i.e., the refractive index of a glass region outside of the outer core is lowered so as to form a depression in its refractive index profile) and increase the degree of extension of light in the diameter direction of the dispersion-shifted fiber, while fluorine is added to both inner core and outer core so as to optimize the refractive index profile (profile having a depression), thereby reducing the polarization-mode dispersion as a whole.

Further, in order to add fluorine to the whole glass region in which light is propagated, it is preferable that the inner cladding be also doped with fluorine. FIG. 11 is a graph showing the respective fluorine dopant amounts in the inner core, outer core, and inner cladding. Thus, the dispersion-shifted fiber according to the present invention can be favorably realized when the inner core, outer core, and inner cladding (glass region positioned on the inner side of the cladding) are doped with fluorine in a dispersion-shifted fiber composition of "double-core+double-cladding" structure.

In optical communication systems, in general, light of 1.3 μm wavelength band or that of 1.55 μm wavelength band is often used as signal light for optical communications. Recently, dispersion-shifted fibers whose zero-dispersion wavelength is shifted to the proximity of 1.55 μm wavelength band have been designed so that their wavelength dispersion (phenomenon in which pulse waves extend in the time-axis direction due to the fact that the propagating speed of light varies according to its wavelength) is nullified with respect to light of 1.55 μm wavelength band. This is because of the fact that the transmission loss of silica-based single-mode optical fibers is minimized with respect to light of 1.55 μm wavelength band. The dispersion-shifted fiber according to the present invention is mainly directed to a single-mode optical fiber applicable to a long-distance transmission line for light of 1.55 μm wavelength band.

Recently, while a wavelength-divided multiple (WDM) long-distance transmission technology has been enabled by the development of optical amplifiers, the distortion in signal light pulses caused by a nonlinear optical phenomenon such as four-wave mixing has become a critical limitation to transmission length and transmission velocity. In the case of multiple optical communications, in particular, since a larger number of signal light pulses with the same wavelength pass through the dispersion-shifted fiber, the portion near the center of the core region (inner core in particular), where the optical power density is high, is more likely to be influenced by the nonlinear optical effect. Accordingly, in the dispersion-shifted fiber according to the present invention, in order to intentionally generate a wavelength dispersion, the zero-dispersion wavelength is slightly shifted from the signal light wavelength band, thereby reducing the influence of the nonlinear optical effect.

Here, the above-mentioned nonlinear optical effect has been known to increase in proportion to the optical power density of signal light (density of signal light intensity at a predetermined part of the SM optical fiber) and the nonlinear refractive index of the optical fiber which is a light-transmitting medium. From the viewpoint of improving transmission characteristics (transmission length in particular), it is unfavorable to lower the signal light intensity. Accordingly, in order to suppress the above-mentioned nonlinear optical effect, it is preferable to lower the above-mentioned nonlinear refractive index or enlarge the mode field diameter (referred to as "MFD" hereinafter) with respect to signal light having a predetermined wavelength so as to decrease the optical power density without lowering the signal light intensity as a whole.

In view of the foregoing, the dispersion-shifted fiber according to the present invention has its zero-dispersion wavelength within the range of at least 1,560 nm but not longer than 1,600 nm, which is slightly shifted from the signal light wavelength (1.5 μm), while having an MFD of not smaller than 8.0 μm in order to decrease the optical power density without lowering the signal light intensity as a whole. Also, the dispersion-shifted fiber has a cutoff wavelength of at least 1.0 μm but not longer than 1.8 μm when its length is 2 m (ITU standard).

Further, the refractive index profile of the dispersion-shifted fiber according to the present invention satisfies the following conditions:

0.01%≦$\Delta n_3$≦0.10%; and

30 μm≦c≦60 μm wherein $\Delta n_3$ is the relative refractive index difference of the outer cladding with respect to the inner cladding, and c is the outer diameter of the inner cladding.

Also, the refractive index profile of the dispersion-shifted fiber according to the present invention satisfies the following conditions:

a/b≦0.20; and b≧15 μm wherein a is the outer diameter of the inner core, and b is the outer diameter of the outer core.

As the dispersion-shifted fiber according to the present invention has the refractive index profile designed above, it can suppress the polarization-mode dispersion to 0.25 ps/ $(km)^{1/2}$ or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 16 is a chart listing the zero-dispersion wavelength (nm) of each embodiment, using the relative refractive index difference $\Delta n_3$ (%) of the outer cladding with respect to the inner cladding and the outer diameter c of the inner cladding as parameters;

FIG. 17 is a chart listing the zero-dispersion wavelength (nm) of FIG. 16 in further detail, using the relative refractive index difference $\Delta n_3$ (%) of the outer cladding with respect to the inner cladding and the outer diameter c of the inner cladding as parameters;

FIG. 18 is a chart listing the polarization-mode dispersion $(ps/(km)^{1/2})$ of each embodiment, using the relative refractive index difference $\Delta n_3$ (%) of the outer cladding with respect to the inner cladding and the outer diameter c of the inner cladding as parameters;

FIG. 19 is a chart listing the polarization-mode dispersion $(ps/(km)^{1/2})$ of FIG. 17 in further detail, using the relative refractive index difference $\Delta n_3$ (%) of the outer cladding with respect to the inner cladding and the outer diameter c of the inner cladding as parameters;

DESCRIPTION OF THE PREFERRED EMBODIMENTS

First, prior to the explanation of the dispersion-shifted fiber according to the present invention, the findings of the inventors will be explained.

Figure 1:
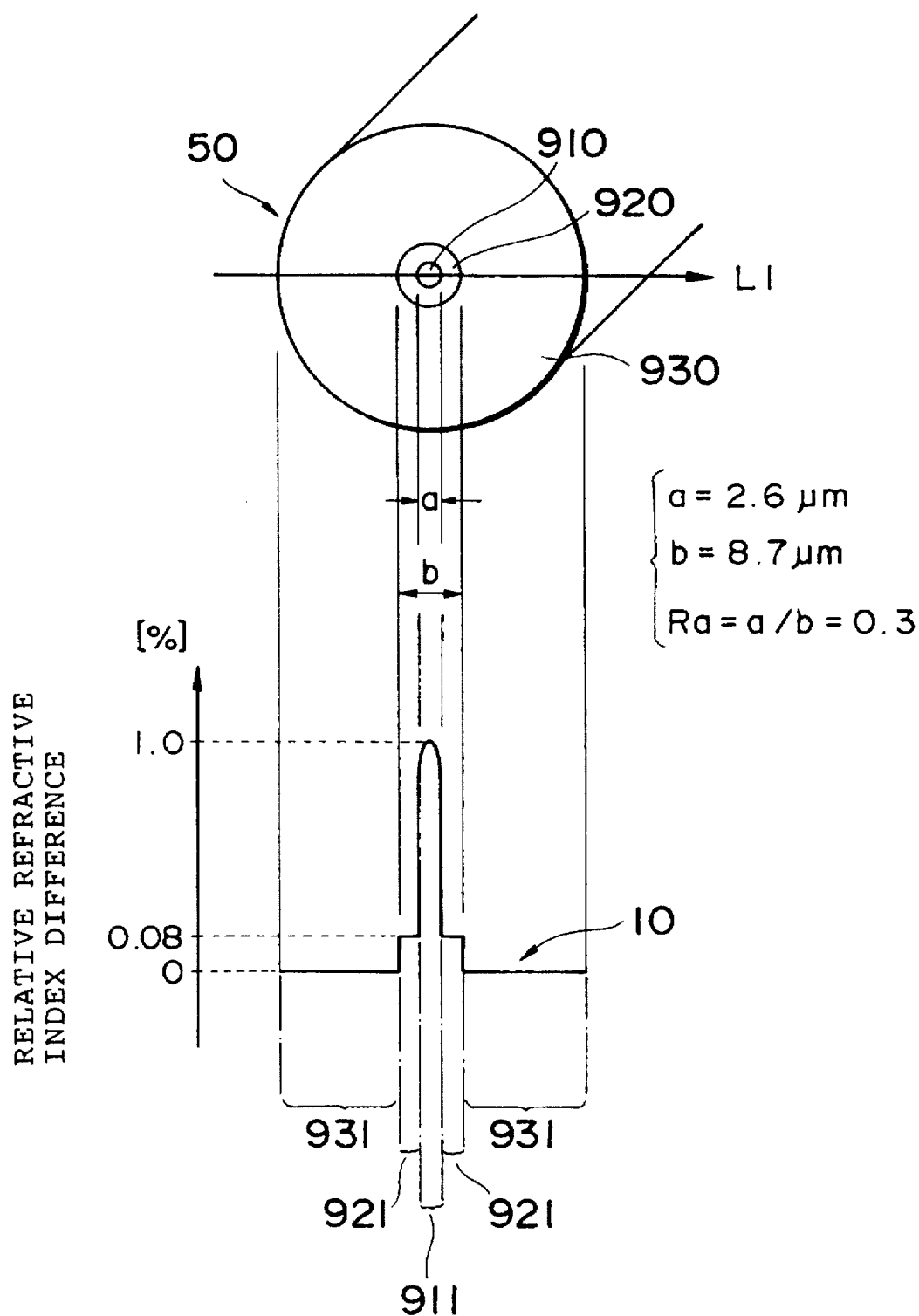
FIG. 1 is a view showing the cross-sectional structure and refractive index profile of a conventional dispersion-shifted fiber.
Figure 2:
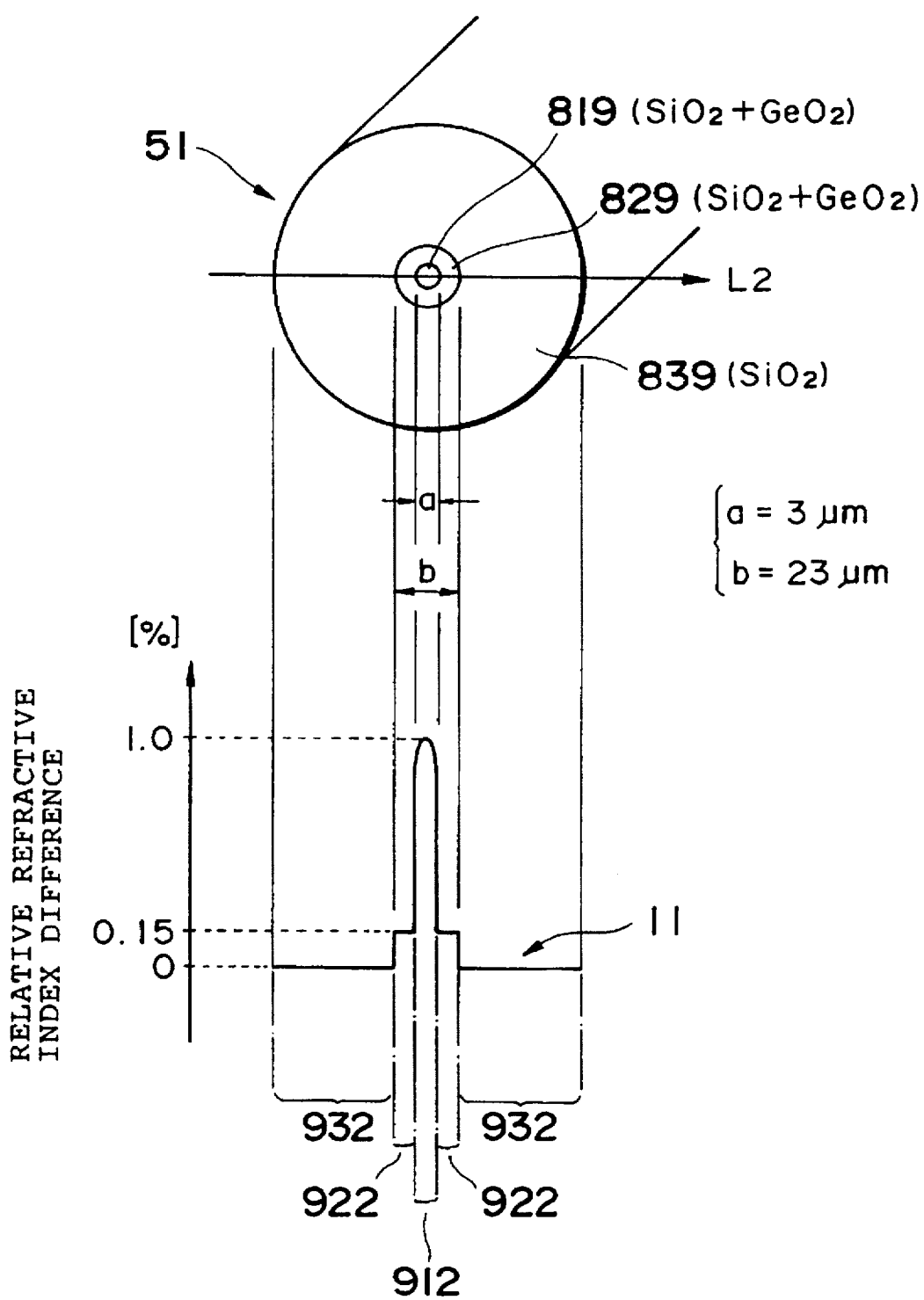
FIG. 2 is a view showing the cross-sectional structure and refractive index profile of a dispersion-shifted fiber used as a reference.

FIG. 2 is a view showing the cross-sectional structure and refractive index profile of a dispersion-shifted fiber on which the findings of the inventors, which will be explained hereinafter, are based. A dispersion-shifted fiber 51 of FIG. 2 is a single-mode optical fiber mainly composed of silica glass and comprises an inner core 819 doped with Ge, having a relative refractive index difference of 1.0% with respect to pure silica glass and an outer diameter a of 3 µm; an outer core 829 disposed around the outer periphery of the inner core 819 and doped with Ge, having a relative refractive index difference of 0.15% with respect to pure silica glass and an outer diameter b of 23 µm; and a cladding 839 disposed around the outer periphery of the outer core 829 and substantially made of pure silica glass, having an outer diameter of 125 µm.

In this specification, relative refractive index difference $\Delta$ is defined as follows:

$$\Delta = (n_i^2 - n_c^2)/2n_c^2 \tag{1}$$

wherein $n_c$ is the refractive index of a glass region (e.g., pure silica glass or cladding) which becomes a reference, and $n_i$ is the refractive index of each glass region. Accordingly, for example, relative refractive index difference $\Delta n_1$ of the inner core 819 having a refractive index $n_1$ with respect to pure silica glass having a refractive index $n_c$ is given by $(n_1^2 -$ $n_c^2)/2n_c^2$. Also, the refractive indices in the above expression can be arranged in either order. Consequently, a glass region where the relative refractive index difference with respect to the reference glass region (e.g., pure silica glass) is a negative value indicates that it is a glass region having a refractive index lower than the refractive index $n_c$ of the reference glass region.

Also, the axis of abscissa of a refractive index profile 11 shown in FIG. 2 corresponds to each position on line L2 in a cross section (plane perpendicular to the advancing direction of signal light propagated therethrough) of the dispersion-shifted fiber 51. Further, in the refractive index profile 11, regions 912, 922, and 932 respectively correspond to the relative refractive index differences on the line L2 of parts in the inner core 819, outer core 829, and cladding 839.

The inventors have confirmed that the zero-dispersion wavelength of the dispersion-shifted fiber 51 shown in FIG. 2 is 1,579 nm and, when a plurality of the dispersion-shifted fibers 51 are made, their mean polarization-mode dispersion becomes about 0.58 ps/(km)$^{1/2}$.

As the light traveling through the dispersion-shifted fiber has a higher degree of extension in the diameter direction, the polarization-mode dispersion becomes smaller as a whole. Accordingly, the first finding of the inventors is that, when the cladding region is constituted by inner and outer claddings having different refractive indices (the outer cladding having a refractive index lower than that of the inner cladding, thereby forming a depression in the refractive index profile), the degree of extension of the light in the diameter direction can be increased, allowing the polarization-mode dispersion to decrease. In the following, Experiment 1 for proving the first finding of the inventors will be explained.

Figure 3:
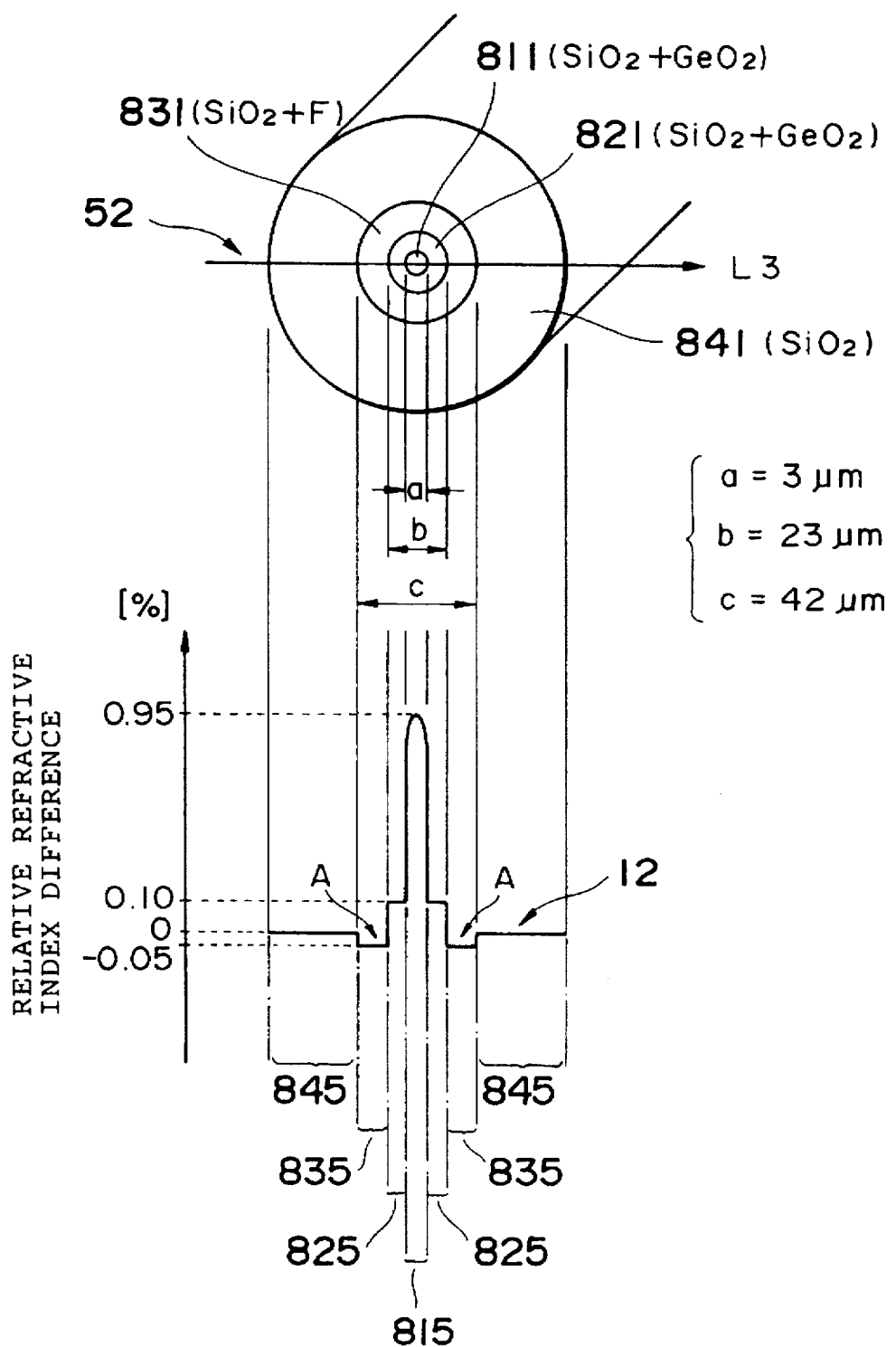
FIG. 3 is a view showing the cross-sectional structure and refractive index profile of a first experiment of a dispersion-shifted fiber (Experiment 1)

FIG. 3 is a view showing the cross-sectional structure and refractive index profile of the dispersion-shifted fiber in Experiment 1. This dispersion-shifted fiber 52 differs from the dispersion-shifted fiber 51 of FIG. 2 in that, while their refractive index profiles in the inner and outer cores have the same form, a glass region corresponding to the cladding 839 of FIG. 2 is constituted by an inner cladding and an outer cladding having a refractive index lower than that of the inner cladding (i.e., its profile 12 has a depression A). As shown in FIG. 3, this dispersion-shifted fiber 52 is also a single-mode optical fiber mainly composed of silica glass and comprises an inner core 811 doped with Ge, having a relative refractive index difference of 0.95% with respect to pure silica glass and an outer diameter a of 3 μm; an outer core 821 disposed around the outer periphery of the inner core 811 and doped with Ge, having a relative refractive index difference of 0.10% with respect to pure silica glass and an outer diameter b of 23 μm; an inner cladding 831 disposed around the outer periphery of the outer core 821 and doped with F, having a relative refractive index difference of −0.05% with respect to pure silica glass and an outer diameter c of 42 μm; and an outer cladding 841 disposed around the outer periphery of the inner cladding 831 and substantially made of pure silica glass, having an outer diameter of 125 μm.

Here, the relative refractive index difference of each glass region in this dispersion-shifted fiber 52 is given by the above expression (1) with reference to the above-mentioned outer cladding 841 (pure silica glass).

Also, the axis of abscissa of the refractive index profile 12 shown in FIG. 3 corresponds to each position on line L3 in a cross section (plane perpendicular to the traveling direction of signal light propagated therethrough) of the dispersion-shifted fiber 52. Further, in the refractive index profile 12, regions 815, 825, 835, and 845 respectively correspond to the relative refractive index differences on the line L3 of parts in the inner core 811, outer core 821, inner cladding 831, and outer cladding 841. Further, the refractive index of the inner cladding 831 is set lower than that of the outer cladding 841 so as to form the depression A in the refractive index profile 12 of the dispersion-shifted fiber 52.

The inventors have confirmed that the zero-dispersion wavelength of the dispersion-shifted fiber 52 shown in FIG. 3 is 1,580 nm and, when a plurality of the dispersion-shifted fibers 52 are made, their mean polarization-mode dispersion becomes about 0.52 ps/(km)$^{1/2}$. Accordingly, as compared with the dispersion-shifted fiber of FIG. 2, that of FIG. 3 can further reduce the polarization-mode dispersion.

The second finding of the inventors is that the polarization-mode dispersion is lowered when fluorine is added to both inner and outer cores without changing the form of regions in the refractive index profile corresponding to the inner and outer cores. In the following, Experiment 2 for proving the second finding of the inventors will be explained.

Figure 4:
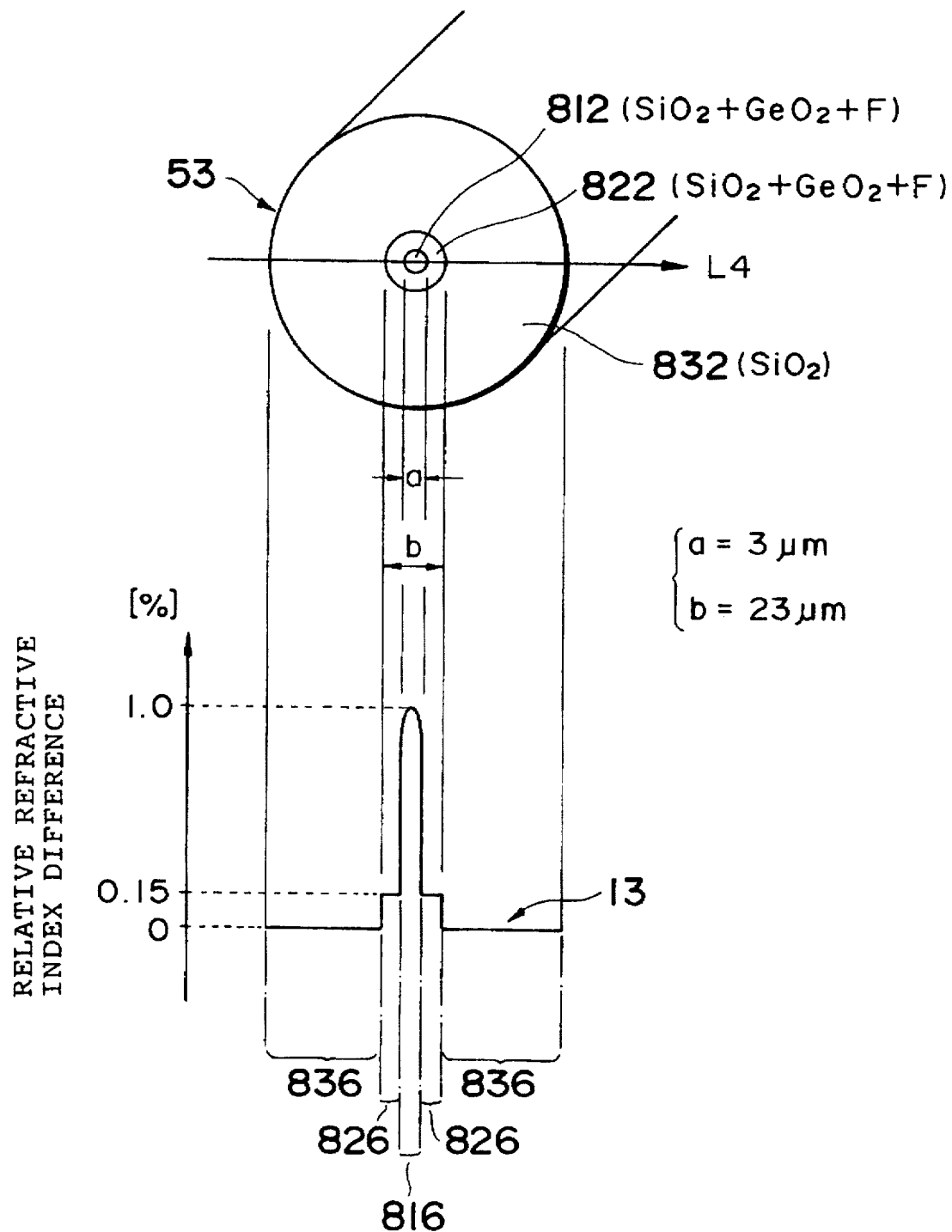
FIG. 4 is a view showing the cross-sectional structure and refractive index profile of a second experiment of a dispersion-shifted fiber (Experiment 2)

FIG. 4 is a view showing the cross-sectional structure and refractive index profile of the dispersion-shifted fiber in Experiment 2. This dispersion-shifted fiber 53 differs from the dispersion-shifted fiber 51 of FIG. 2 in that, while their refractive index profiles have the same form, fluorine (F) is added to both inner and outer cores. The dispersion-shifted fiber 53 of FIG. 4 is a single-mode optical fiber mainly composed of silica glass and comprises an inner core 812 doped with Ge and F, having a relative refractive index difference of 1.0% with respect to pure silica glass and an outer diameter a of 3 μm; an outer core 822 disposed around the outer periphery of the inner core 812 and doped with Ge and F, having a relative refractive index difference of 0.15% with respect to pure silica glass and an outer diameter b of 23 μm; and a cladding 832 disposed around the outer periphery of the inner cladding 822 and substantially made of pure silica glass, having an outer diameter of 125 μm.

Here, the relative refractive index difference of each glass region in this dispersion-shifted fiber 53 is given by the above expression (1) with reference to the above-mentioned cladding 832 (pure silica glass).

Also, the axis of abscissa of a refractive index profile 13 shown in FIG. 4 corresponds to each position on line L4 in a cross section (plane perpendicular to the traveling direction of signal light propagated therethrough) of the dispersion-shifted fiber 53. Further, in the refractive index profile 13, regions 816, 826, and 836 respectively correspond to the relative refractive index differences on the line L4 of parts in the inner core 812, outer core 822, and cladding 832.

The inventors have confirmed that the zero-dispersion wavelength of the dispersion-shifted fiber 52 shown in FIG. 4 is 1,579 nm and, when a plurality of the dispersion-shifted fibers 53 are made, their mean polarization-mode dispersion becomes about 0.51 ps/(km)$^{1/2}$. Accordingly, as compared with the dispersion-shifted fiber of FIG. 2, that of FIG. 4 can further reduce the polarization-mode dispersion.

In the following, embodiments of the dispersion-shifted fiber according to the present invention will be explained with reference to the attached drawings.

Figure 5:
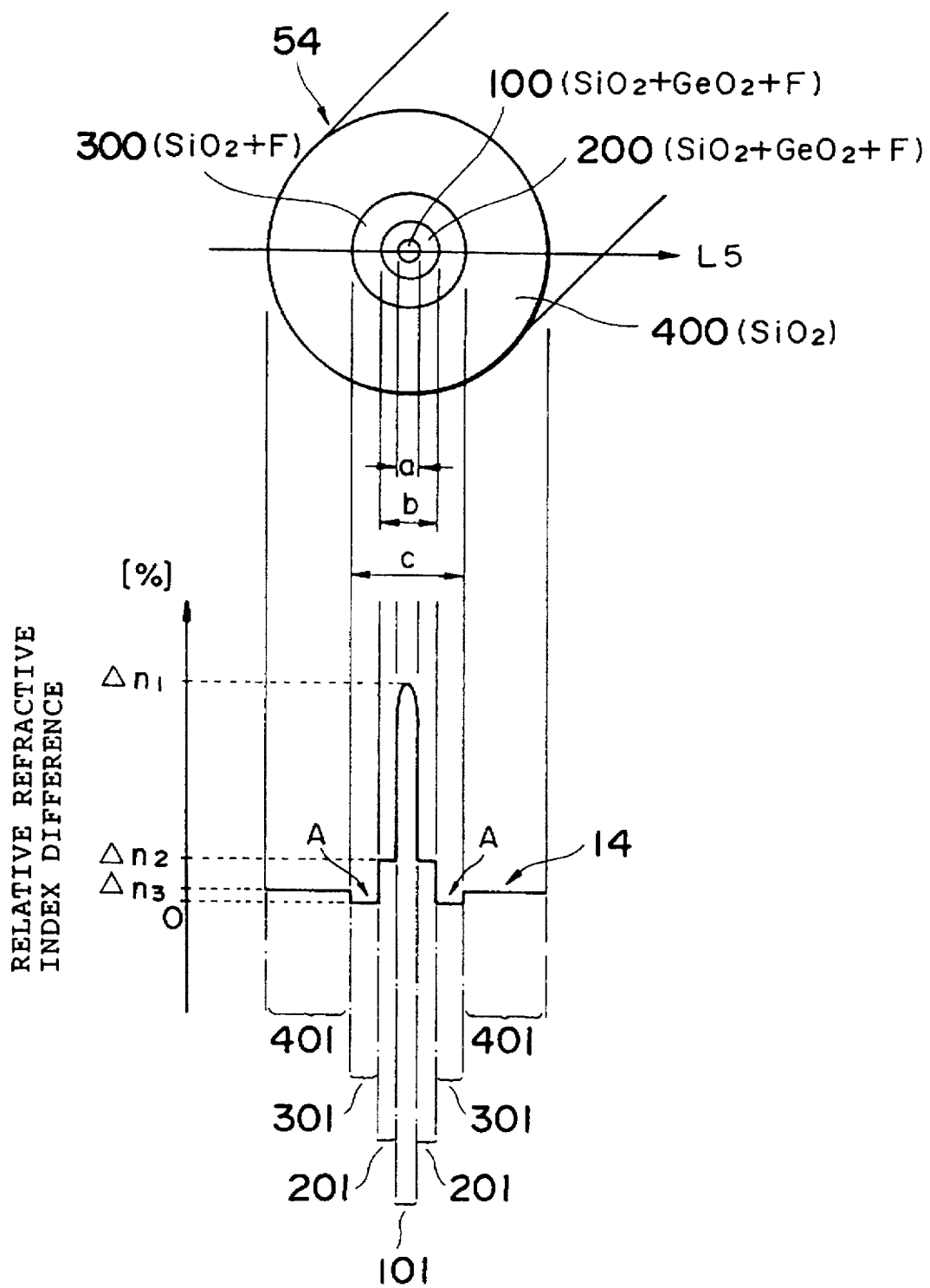
FIG. 5 is a view showing a basic configuration (cross-sectional structure and refractive index profile) of the dispersion-shifted fiber according to the present invention.

FIG. 5 is a view showing, as a basic configuration of the dispersion-shifted fiber according to the present invention, its cross-sectional structure and refractive index profile. A dispersion-shifted fiber 54 of FIG. 5 is a single-mode optical fiber mainly composed of silica glass and comprises an inner core 100 doped with Ge and F; an outer core 200 disposed around the outer periphery of the inner core 100 and doped with Ge and F, having a refractive index lower than that of the inner core 100; an inner cladding 300 disposed around the outer periphery of the outer core 200 and doped with F, having a refractive index lower than that of the outer core 200; and an outer cladding 400 disposed around the outer periphery of the inner cladding 300 and made of pure silica glass, having an outer diameter of 125 µm.

Then, relative refractive index difference $\Delta n_1$ of the inner core 100 with respect to the inner cladding 300, relative refractive index difference $\Delta n_2$ of the outer core 200 with respect to the inner cladding 300, and relative refractive index difference $\Delta n_3$ of the outer cladding 400 with respect to the inner cladding 300 are set such that zero-dispersion wavelength $\lambda_0$ becomes a predetermined value within the range from 1.4 µm to 1.7 µm. Here, the relative refractive index difference of each glass region in this dispersion-shifted fiber 54 is given by the above expression (1) with reference to the above-mentioned inner cladding 300.

Also, the axis of abscissa of a refractive index profile 14 shown in FIG. 5 corresponds to each position on line L5 in a cross section (plane perpendicular to the advancing direction of signal light propagated therethrough) of the dispersion-shifted fiber 55. Further, in the refractive index profile 14, regions 101, 201, 301, and 401 respectively correspond to the relative refractive index differences on the line L5 of parts in the inner core 100, outer core 200, inner cladding 300, and outer cladding 400. Further, the refractive index of the inner cladding 300 is set lower than that of the outer cladding 400 so as to form a depression A in the refractive index profile 14 of the dispersion-shifted fiber 54.

The dispersion-shifted fiber according to the present invention transmits therethrough incident light as being centered at the inner core 100, while restraining polarization-mode dispersion from generating.

In the following, explanation will be provided for embodiments of the dispersion-shifted fiber in which regions corresponding to the inner and outer cores have a refractive index profile (where $\Delta n_1=1.0\%$ and $\Delta n_2=0.15\%$) coinciding with that of FIG. 2, while the relative refractive index difference $\Delta n_3$ of the outer cladding with respect to the inner cladding and the outer diameter c of the inner cladding are changed. Here, a predetermined concentration of fluorine is added to each glass region of the inner core, outer core, and inner cladding.

Embodiment 1

Figure 6:
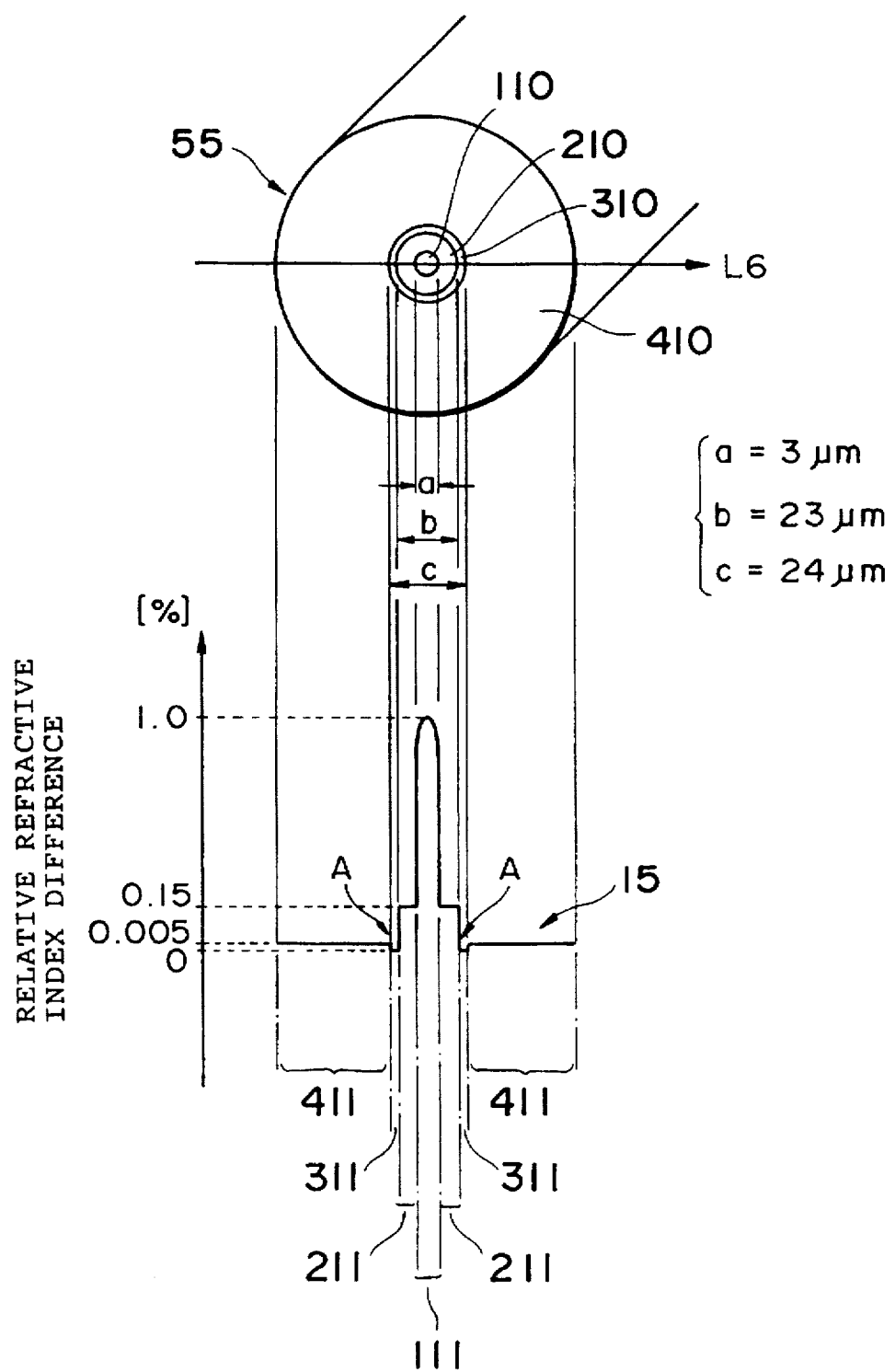
FIG. 6 is a view showing the cross-sectional structure and refractive index profile of a first embodiment of the dispersion-shifted fiber according to the present invention (Embodiment 1)

FIG. 6 is a view showing the cross-sectional structure and refractive index profile of the dispersion-shifted fiber according to the present invention in Embodiment 1. A dispersion-shifted fiber 55 of FIG. 6 is a single-mode optical fiber mainly composed of silica glass and comprises an inner core 110 doped with Ge and F, having a relative refractive index difference of 1.0% with respect to an inner cladding 310 and an outer diameter a of 3.0 µm; an outer core 210 disposed around the outer periphery of the inner core 110 and doped with Ge and F, having a relative refractive index difference of 0.15% with respect to the inner cladding 310 and an outer diameter b of 23 µm; the inner cladding 310 disposed around the outer periphery of the outer core 210 and doped with F, having an outer diameter c of 24 µm; and an outer cladding 410 disposed around the outer periphery of the inner cladding 310 and made of pure silica glass, having a relative refractive index difference of 0.005% with respect to the inner cladding 310 and an outer diameter of 125 µm. The zero-dispersion wavelength of the dispersion-shifted fiber 55 of this embodiment is 1,571 nm.

Here, the relative refractive index difference of each glass region in this dispersion-shifted fiber 55 is given by the above expression (1) with reference to the above-mentioned inner cladding 310.

Also, the axis of abscissa of a refractive index profile 15 shown in FIG. 6 corresponds to each position on line L6 in a cross section (plane perpendicular to the traveling direction of signal light propagated therethrough) of the dispersion-shifted fiber 55. Further, in the refractive index profile 15, regions 111, 211, 311, and 411 respectively correspond to the relative refractive index differences on the line L6 of parts in the inner core 110, outer core 210, inner cladding 310, and outer cladding 410. Further, the refractive index of the inner cladding 310 is set lower than that of the outer cladding 410 so as to form a depression A in the refractive index profile 15 of the dispersion-shifted fiber 55.

The inventors have confirmed that, when a plurality of the dispersion-shifted fibers 55 are made, their mean polarization-mode dispersion becomes 0.49 ps/(km)$^{1/2}$.

Embodiment 2

Figure 7:
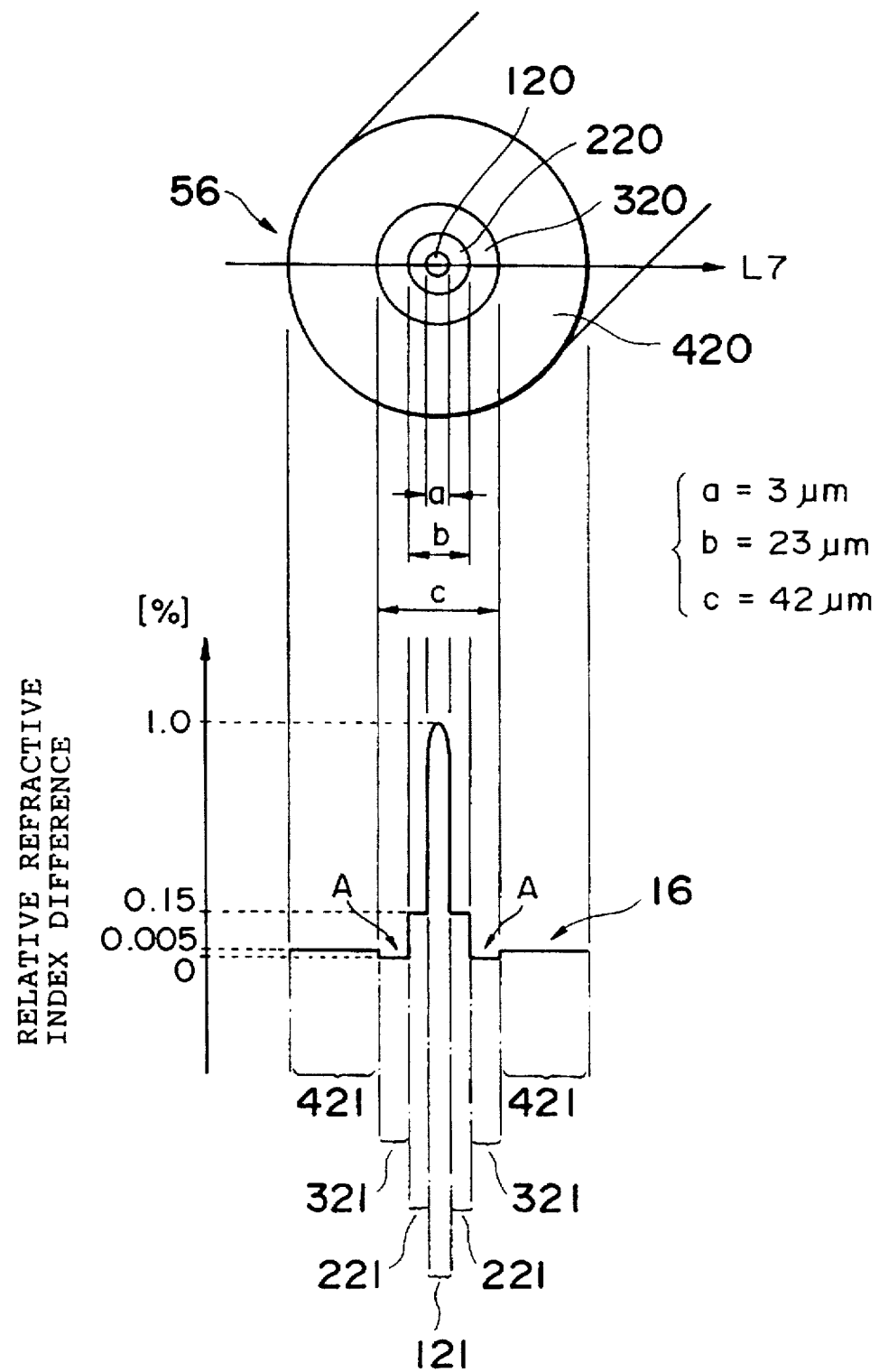
FIG. 7 is a view showing the cross-sectional structure and refractive index profile of a second embodiment of the dispersion-shifted fiber according to the present invention (Embodiment 2)

FIG. 7 is a view showing the cross-sectional structure and refractive index profile of the dispersion-shifted fiber according to the present invention in Embodiment 2. A dispersion-shifted fiber 56 of FIG. 7 is a single-mode optical fiber mainly composed of silica glass and comprises an inner core 120 doped with Ge and F, having a relative refractive index difference of 1.0% with respect to an inner cladding 320 and an outer diameter a of 3.0 µm; an outer core 220 disposed around the outer periphery of the inner core 120 and doped with Ge and F, having a relative refractive index difference of 0.15% with respect to the inner cladding 320 and an outer diameter b of 23 µm; the inner cladding 320 disposed around the outer periphery of the outer core 220 and doped with F, having an outer diameter c of 42 µm; and an outer cladding 420 disposed around the outer periphery of the inner cladding 320 and made of pure silica glass, having a relative refractive index difference of 0.005% with respect to the inner cladding 320 and an outer diameter of 125 µm. The zero-dispersion wavelength of the dispersion-shifted fiber 56 of this embodiment is 1,575 nm.

Here, the relative refractive index difference of each glass region in this dispersion-shifted fiber 56 is given by the above expression (1) with reference to the above-mentioned inner cladding 320.

Also, the axis of abscissa of a refractive index profile 16 shown in FIG. 7 corresponds to each position on line L7 in a cross section (plane perpendicular to the traveling direction of signal light propagated therethrough) of the dispersion-shifted fiber 56. Further, in the refractive index profile 16, regions 121, 221, 321, and 421 respectively correspond to the relative refractive index differences on the line L7 of parts in the inner core 120, outer core 220, inner cladding 320, and outer cladding 420. Further, the refractive index of the inner cladding 320 is set lower than that of the outer cladding 420 so as to form a depression A in the refractive index profile 16 of the dispersion-shifted fiber 56.

The inventors have confirmed that, when a plurality of the dispersion-shifted fibers 56 are made, their mean polarization-mode dispersion becomes 0.38 ps/(km)$^{1/2}$.

Embodiment 3

Figure 8:
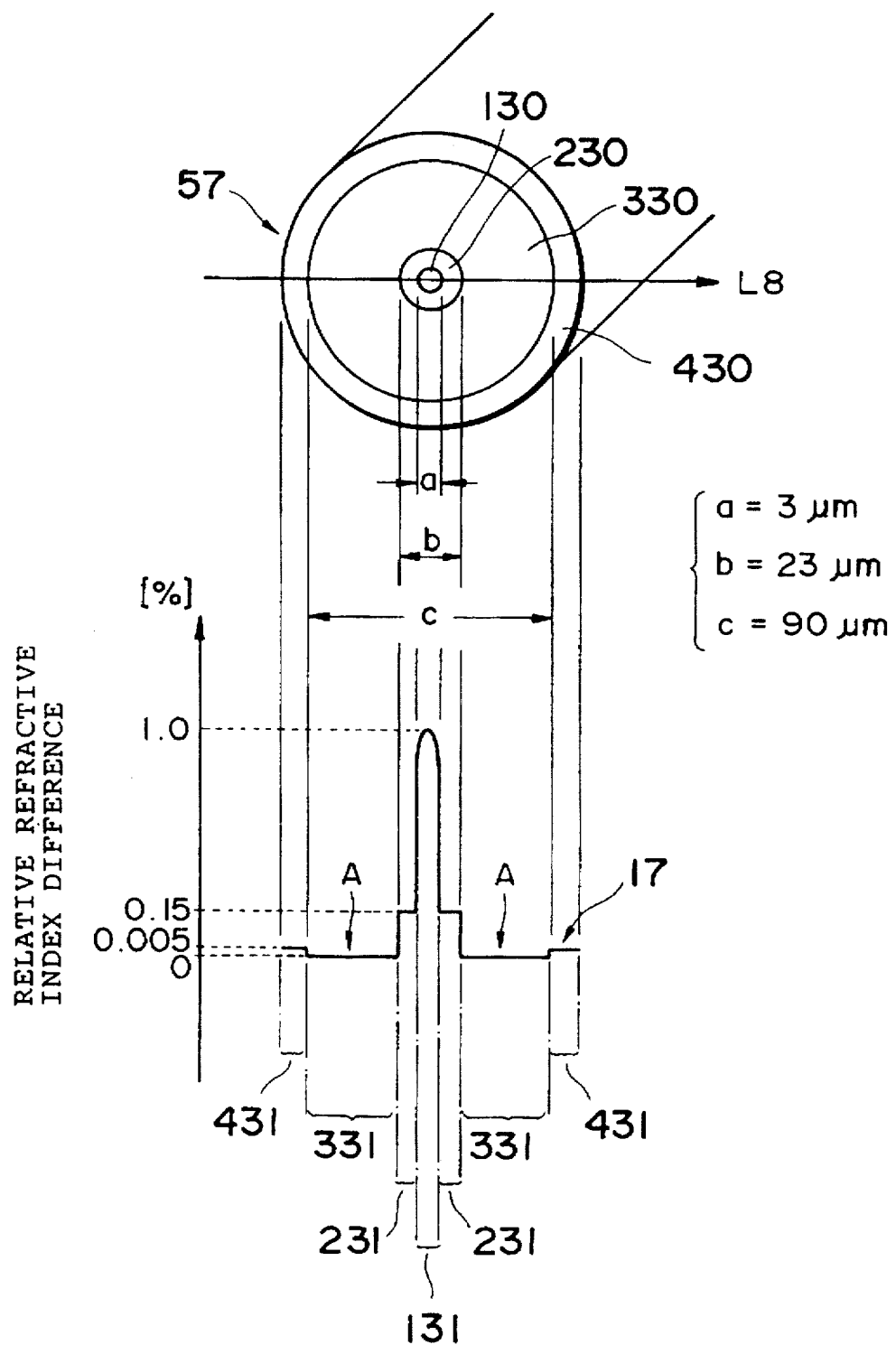
FIG. 8 is a view showing the cross-sectional structure and refractive index profile of a third embodiment of the dispersion-shifted fiber according to the present invention (Embodiment 3)

FIG. 8 is a view showing the cross-sectional structure and refractive index profile of the dispersion-shifted fiber according to the present invention in Embodiment 3. A dispersion-shifted fiber 57 of FIG. 8 is a single-mode optical fiber mainly composed of silica glass and comprises an inner core 130 doped with Ge and F, having a relative refractive index difference of 1.0% with respect to an inner cladding 330 and an outer diameter a of 3.0 µm; an outer core 230 disposed around the outer periphery of the inner core 130 and doped with Ge and F, having a relative refractive index difference of 0.15% with respect to the inner cladding 330 and an outer diameter b of 23 µm; the inner cladding 330 disposed around the outer periphery of the outer core 230 and doped with F, having an outer diameter c of 90 µm; and an outer cladding 430 disposed around the outer periphery of the inner cladding 330 and made of pure silica glass, having a relative refractive index difference of 0.005% with respect to the inner cladding 330 and an outer diameter of 125 µm. The zero-dispersion wavelength of the dispersion-shifted fiber 57 of this embodiment is 1,579 nm.

Here, the relative refractive index difference of each glass region in this dispersion-shifted fiber 57 is given by the above expression (1) with reference to the above-mentioned inner cladding 330.

Also, the axis of abscissa of a refractive index profile 17 shown in FIG. 8 corresponds to each position on line L8 in a cross section (plane perpendicular to the traveling direction of signal light propagated therethrough) of the dispersion-shifted fiber 57. Further, in the refractive index profile 17, regions 131, 231, 331, and 431 respectively correspond to the relative refractive index differences on the line L8 of parts in the inner core 130, outer core 230, inner cladding 330, and outer cladding 430. Further, the refractive index of the inner cladding 330 is set lower than that of the outer cladding 430 so as to form a depression A in the refractive index profile 17 of the dispersion-shifted fiber 57.

The inventors have confirmed that, when a plurality of the dispersion-shifted fibers 57 are made, their mean polarization-mode dispersion becomes 0.48 ps/(km)$^{1/2}$.

Embodiment 4

Figure 9:
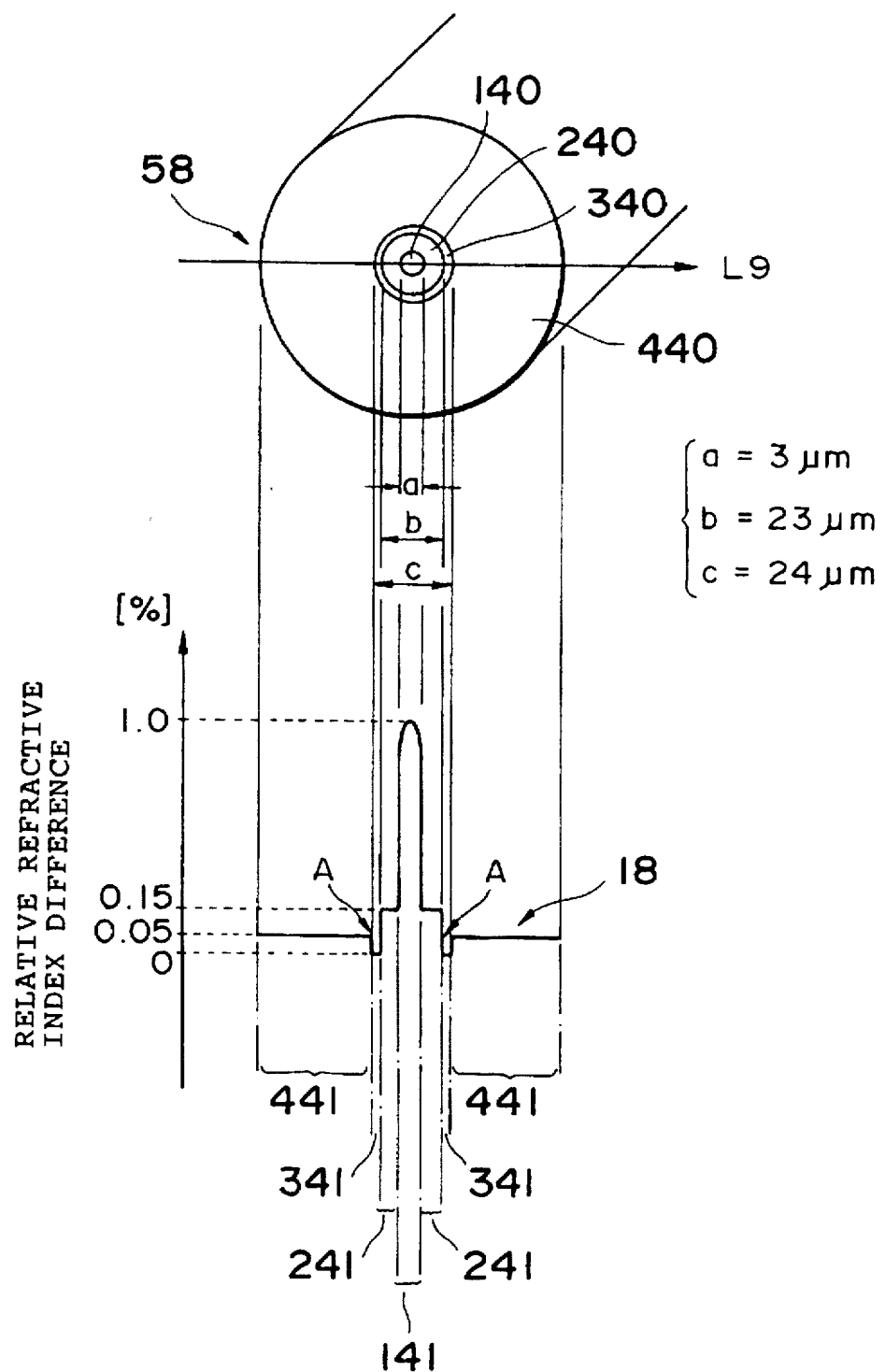
FIG. 9 is a view showing the cross-sectional structure and refractive index profile of a fourth embodiment of the dispersion-shifted fiber according to the present invention (Embodiment 4)

FIG. 9 is a view showing the cross-sectional structure and refractive index profile of the dispersion-shifted fiber according to the present invention in Embodiment 4. A dispersion-shifted fiber 58 of FIG. 9 is a single-mode optical fiber mainly composed of silica glass and comprises an inner core 140 doped with Ge and F, having a relative refractive index difference of 1.0% with respect to an inner cladding 340 and an outer diameter a of 3.0 µm; an outer core 240 disposed around the outer periphery of the inner core 140 and doped with Ge and F, having a relative refractive index difference of 0.15% with respect to the inner cladding 340 and an outer diameter b of 23 µm; the inner cladding 340 disposed around the outer periphery of the outer core 240 and doped with F, having an outer diameter c of 24 µm; and an outer cladding 440 disposed around the outer periphery of the inner cladding 340 and made of pure silica glass, having a relative refractive index difference of 0.05% with respect to the inner cladding 340 and an outer diameter of 125 µm. The zero-dispersion wavelength of the dispersion-shifted fiber 58 of this embodiment is 1,576 nm.

Here, the relative refractive index difference of each glass region in this dispersion-shifted fiber 58 is given by the above expression (1) with reference to the above-mentioned inner cladding 340.

Also, the axis of abscissa of a refractive index profile 18 shown in FIG. 9 corresponds to each position on line L9 in a cross section (plane perpendicular to the traveling direction of signal light propagated therethrough) of the dispersion-shifted fiber 58. Further, in the refractive index profile 18, regions 141, 241, 341, and 441 respectively correspond to the relative refractive index differences on the line L9 of parts in the inner core 140, outer core 240, inner cladding 340, and outer cladding 440. Further, the refractive index of the inner cladding 340 is set lower than that of the outer cladding 440 so as to form a depression A in the refractive index profile 18 of the dispersion-shifted fiber 58.

The inventors have confirmed that, when a plurality of the dispersion-shifted fibers 58 are made, their mean polarization-mode dispersion becomes 0.32 ps/(km)$^{1/2}$.

Embodiment 5

Figure 10:
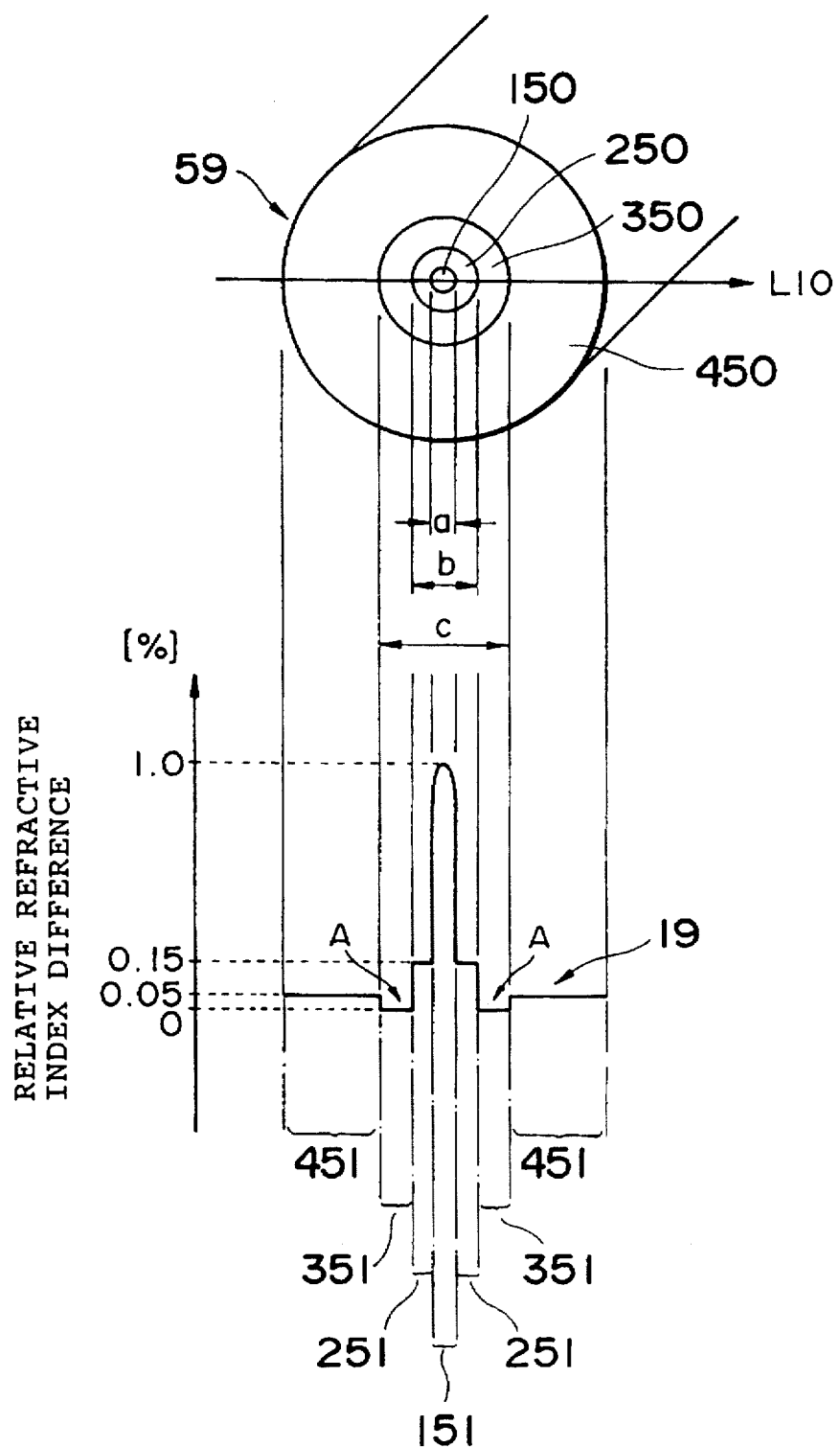
FIG. 10 is a view showing the cross-sectional structure and refractive index profile of a fifth embodiment of the dispersion-shifted fiber according to the present invention (Embodiment 5)

FIG. 10 is a view showing the cross-sectional structure and refractive index profile of the dispersion-shifted fiber according to the present invention in Embodiment 5. A dispersion-shifted fiber 59 of FIG. 10 is a single-mode optical fiber mainly composed of silica glass and comprises an inner core 150 doped with Ge and F, having a relative refractive index difference of 1.0% with respect to an inner cladding 350 and an outer diameter a of 3.0 µm; an outer core 250 disposed around the outer periphery of the inner core 150 and doped with Ge and F, having a relative refractive index difference of 0.15% with respect to the inner cladding 350 and an outer diameter b of 23 µm; the inner cladding 350 disposed around the outer periphery of the outer core 250 and doped with F, having an outer diameter c of 42 µm; and an outer cladding 450 disposed around the outer periphery of the inner cladding 350 and made of pure silica glass, having a relative refractive index difference of 0.05% with respect to the inner cladding 350 and an outer diameter of 125 µm. The zero-dispersion wavelength of the dispersion-shifted fiber 59 of this embodiment is 1,580 nm.

Here, the relative refractive index difference of each glass region in this dispersion-shifted fiber 59 is given by the above expression (1) with reference to the above-mentioned inner cladding 350.

Also, the axis of abscissa of a refractive index profile 19 shown in FIG. 10 corresponds to each position on line L10 in a cross section (plane perpendicular to the traveling direction of signal light propagated therethrough) of the dispersion-shifted fiber 59. Further, in the refractive index profile 19, regions 151, 251, 351, and 451 respectively correspond to the relative refractive index differences on the line L10 of parts in the inner core 150, outer core 250, inner cladding 350, and outer cladding 450. Further, the refractive index of the inner cladding 350 is set lower than that of the outer cladding 450 so as to form a depression A in the refractive index profile 19 of the dispersion-shifted fiber 59.

Figure 11:
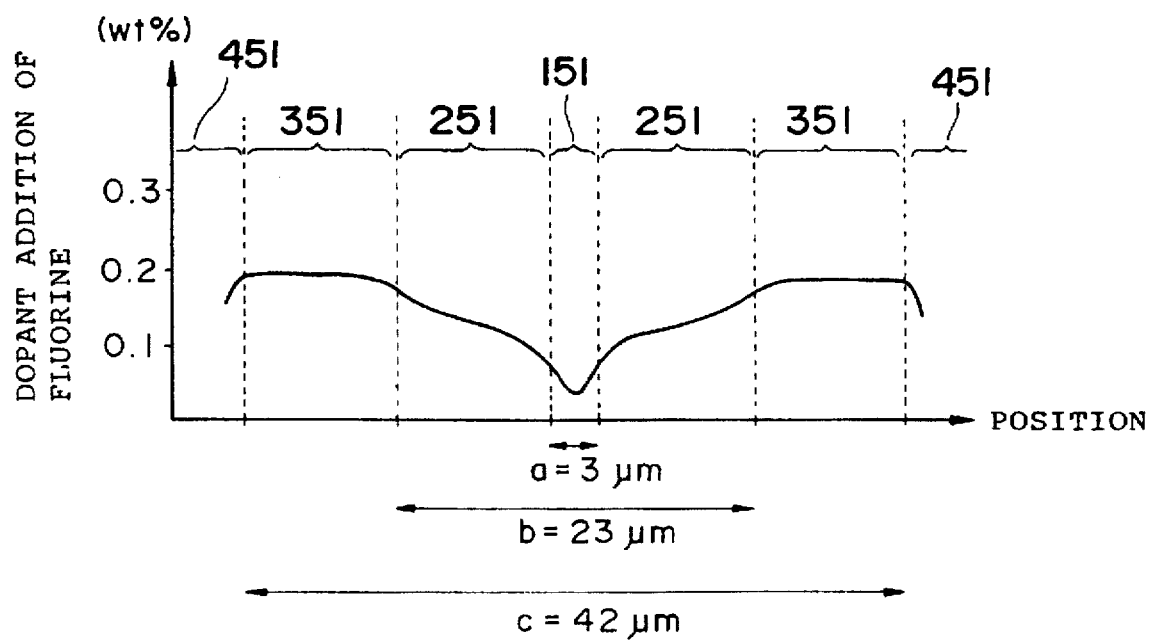
FIG. 11 is a graph showing fluorine contents in the respective glass regions in the dispersion-shifted fiber (Embodiment 5) shown in FIG. 9.

The inventors have confirmed that, when a plurality of the dispersion-shifted fibers 59 are made, their mean polarization-mode dispersion becomes 0.15 ps/(km)$^{1/2}$. Also, each glass region in the dispersion-shifted fiber 59 of this embodiment contains a predetermined amount of fluorine as shown in FIG. 11.

Further, in these dispersion-shifted fibers 59 of Embodiment 5, the respective averages of zero-dispersion wavelength ($\lambda_0$), mode-field diameter (MFD), cutoff wavelength at 2 m in length (ITU standard), and polarization-mode dispersion (PMD) are represented as follows:
zero-dispersion wavelength ($\lambda_0$) : 1580 (nm);
MFD: 9.0 (µm);
cutoff wavelength (at 2 m in length) : 1.48 (nm); and
PMD: 0.15 (ps/(km)$^{1/2}$).

Embodiment 6

Figure 12:
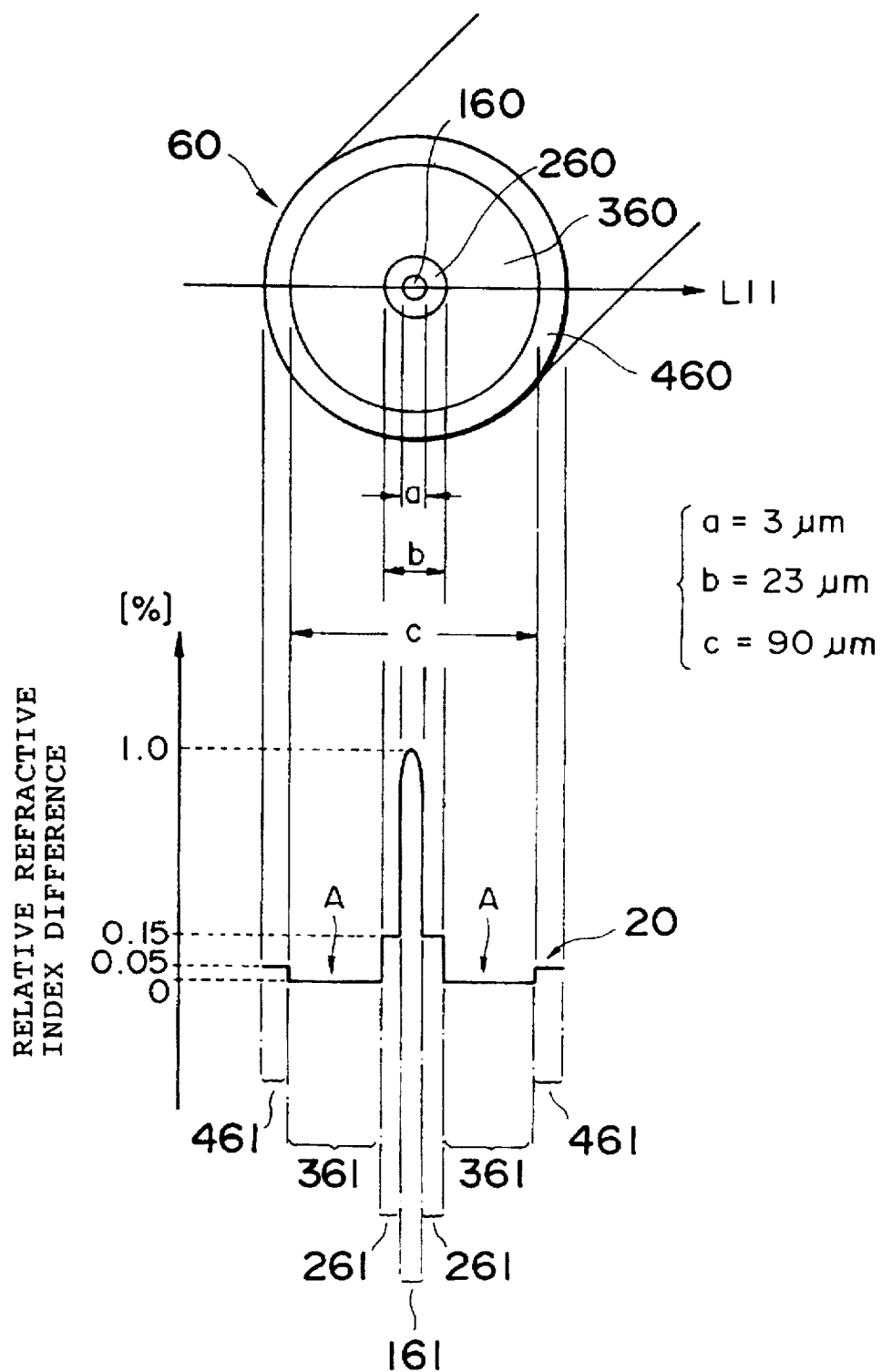
FIG. 12 is a view showing the cross-sectional structure and refractive index profile of a sixth embodiment of the dispersion-shifted fiber according to the present invention (Embodiment 6)

FIG. 12 is a view showing the cross-sectional structure and refractive index profile of the dispersion-shifted fiber according to the present invention in Embodiment 6. A dispersion-shifted fiber 60 of FIG. 12 is a single-mode optical fiber mainly composed of silica glass and comprises an inner core 160 doped with Ge and F, having a relative refractive index difference of 1.0% with respect to an inner cladding 360 and an outer diameter a of 3.0 µm; an outer core 260 disposed around the outer periphery of the inner core 160 and doped with Ge and F, having a relative refractive index difference of 0.15% with respect to the inner cladding 360 and an outer diameter b of 23 µm; the inner cladding 360 disposed around the outer periphery of the outer core 260 and doped with F, having an outer diameter c of 90 µm; and an outer cladding 460 disposed around the outer periphery of the inner cladding 360 and made of pure silica glass, having a relative refractive index difference of 0.05% with respect to the inner cladding 360 and an outer diameter of 125 µm. The zero-dispersion wavelength of the dispersion-shifted fiber 60 of this embodiment is 1,584 nm.

Here, the relative refractive index difference of each glass region in this dispersion-shifted fiber 60 is given by the above expression (1) with reference to the above-mentioned inner cladding 360.

Also, the axis of abscissa of a refractive index profile 20 shown in FIG. 12 corresponds to each position on line L11 in a cross section (plane perpendicular to the traveling direction of signal light propagated therethrough) of the dispersion-shifted fiber 60. Further, in the refractive index profile 20, regions 161, 261, 361, and 461 respectively correspond to the relative refractive index differences on the line L11 of parts in the inner core 160, outer core 260, inner cladding 360, and outer cladding 460. Further, the refractive index of the inner cladding 360 is set lower than that of the outer cladding 460 so as to form a depression A in the refractive index profile 20 of the dispersion-shifted fiber 60.

The inventors have confirmed that, when a plurality of the dispersion-shifted fibers 60 are made, their mean polarization-mode dispersion becomes 0.39 ps/(km)$^{1/2}$.

Embodiment 7

Figure 13:
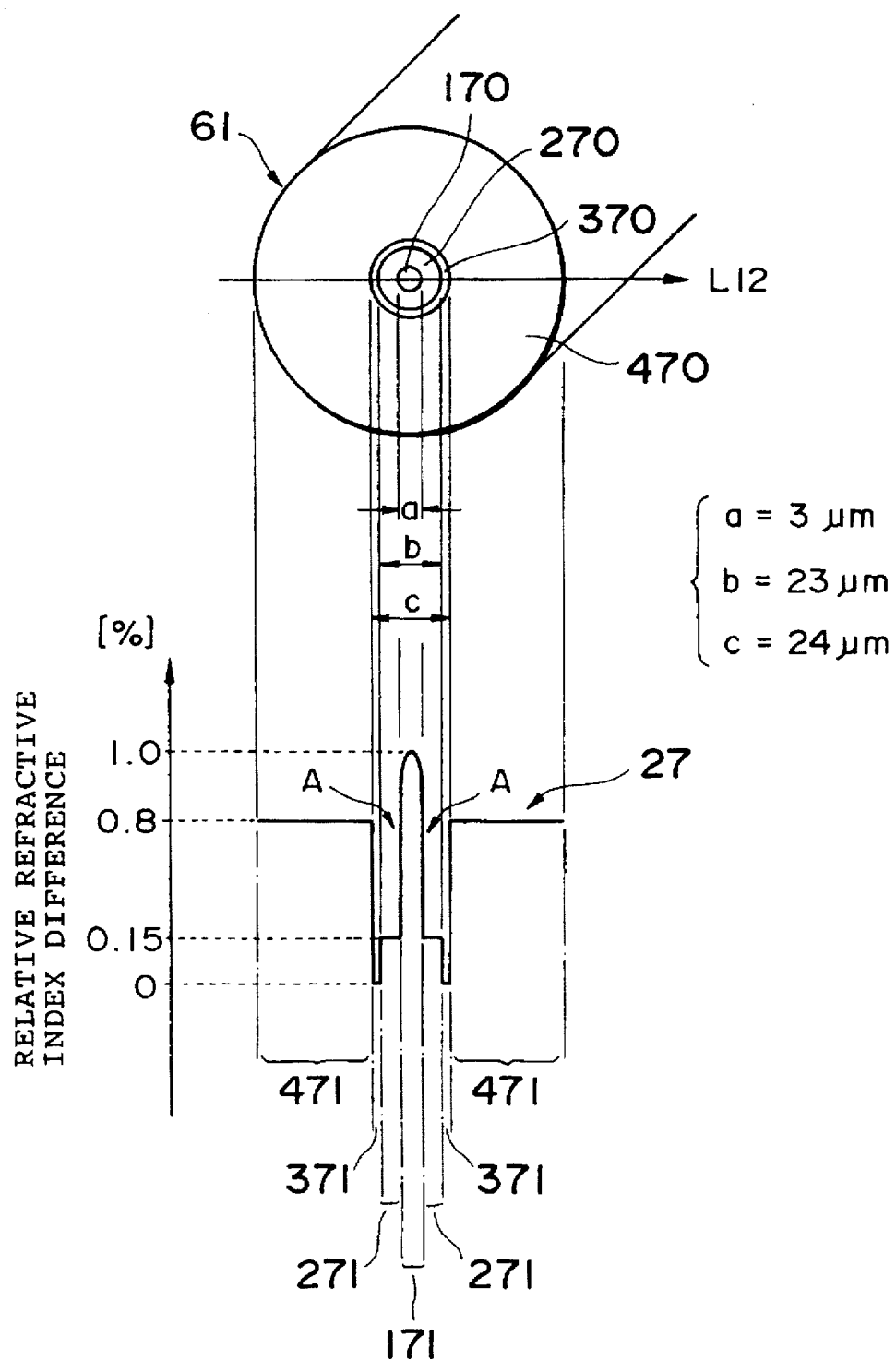
FIG. 13 is a view showing the cross-sectional structure and refractive index profile of a seventh embodiment of the dispersion-shifted fiber according to the present invention (Embodiment 7)

FIG. 13 is a view showing the cross-sectional structure and refractive index profile of the dispersion-shifted fiber according to the present invention in Embodiment 7. A dispersion-shifted fiber 61 of FIG. 13 is a single-mode optical fiber mainly composed of silica glass and comprises an inner core 170 doped with Ge and F, having a relative refractive index difference of 1.0% with respect to an inner cladding 370 and an outer diameter a of 3.0 µm; an outer core 270 disposed around the outer periphery of the inner core 170 and doped with Ge and F, having a relative refractive index difference of 0.15% with respect to the inner cladding 370 and an outer diameter b of 23 µm; the inner cladding 370 disposed around the outer periphery of the outer core 270 and doped with F, having an outer diameter c of 24 µm; and an outer cladding 470 disposed around the outer periphery of the inner cladding 370 and made of pure silica glass, having a relative refractive index difference of 0.8% with respect to the inner cladding 370 and an outer diameter of 125 µm. The zero-dispersion wavelength of the dispersion-shifted fiber 61 of this embodiment is 1,581 nm.

Here, the relative refractive index difference of each glass region in this dispersion-shifted fiber 61 is given by the above expression (1) with reference to the above-mentioned inner cladding 370.

Also, the axis of abscissa of a refractive index profile 21 shown in FIG. 13 corresponds to each position on line L12 in a cross section (plane perpendicular to the traveling direction of signal light propagated therethrough) of the dispersion-shifted fiber 61. Further, in the refractive index profile 21, regions 171, 271, 371, and 471 respectively correspond to the relative refractive index differences on the line L12 of parts in the inner core 170, outer core 270, inner cladding 370, and outer cladding 470. Further, the refractive index of the inner cladding 370 is set lower than that of the outer cladding 470 so as to form a depression A in the refractive index profile 21 of the dispersion-shifted fiber 61.

The inventors have confirmed that, when a plurality of the dispersion-shifted fibers 61 are made, their mean polarization-mode dispersion becomes 0.43 ps/(km)$^{1/2}$.

Embodiment 8

Figure 14:
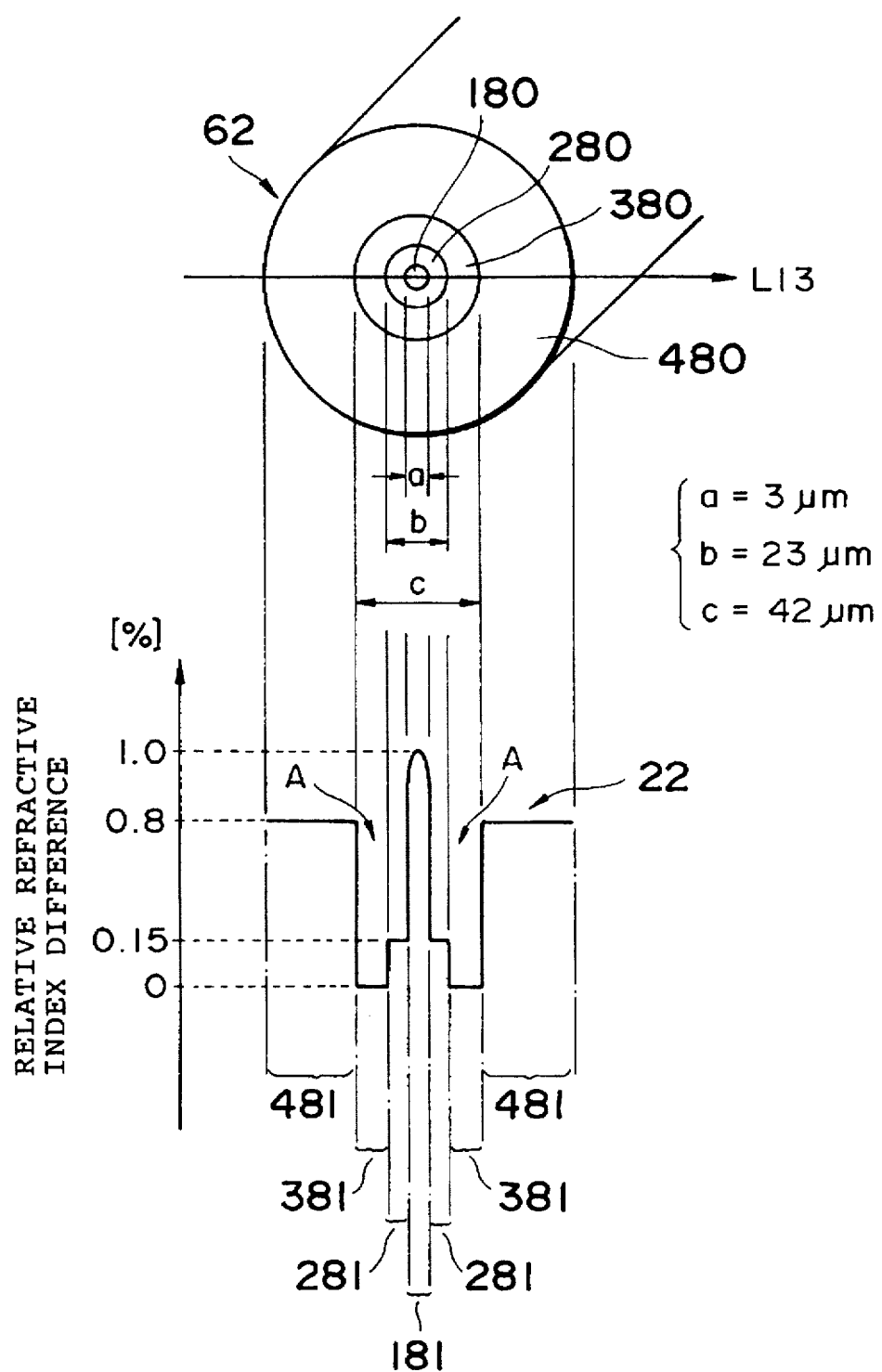
FIG. 14 is a view showing the cross-sectional structure and refractive index profile of an eighth embodiment of the dispersion-shifted fiber according to the present invention (Embodiment 8)

FIG. 14 is a view showing the cross-sectional structure and refractive index profile of the dispersion-shifted fiber according to the present invention in Embodiment 8. A dispersion-shifted fiber 62 of FIG. 14 is a single-mode optical fiber mainly composed of silica glass and comprises an inner core 180 doped with Ge and F, having a relative refractive index difference of 1.0% with respect to an inner cladding 380 and an outer diameter a of 3.0 µm; an outer core 280 disposed around the outer periphery of the inner core 180 and doped with Ge and F, having a relative refractive index difference of 0.15% with respect to the inner cladding 380 and an outer diameter b of 23 µm; the inner cladding 380 disposed around the outer periphery of the outer core 280 and doped with F, having an outer diameter c of 42 µm; and an outer cladding 480 disposed around the outer periphery of the inner cladding 380 and made of pure silica glass, having a relative refractive index difference of 0.8% with respect to the inner cladding 380 and an outer diameter of 125 µm. The zero-dispersion wavelength of the dispersion-shifted fiber 62 of this embodiment is 1,585 nm.

Here, the relative refractive index difference of each glass region in this dispersion-shifted fiber 62 is given by the above expression (1) with reference to the above-mentioned inner cladding 380.

Also, the axis of abscissa of a refractive index profile 22 shown in FIG. 14 corresponds to each position on line L13 in a cross section (plane perpendicular to the traveling direction of signal light propagated therethrough) of the dispersion-shifted fiber 62. Further, in the refractive index profile 22, regions 181, 281, 381, and 481 respectively correspond to the relative refractive index differences on the line L13 of parts in the inner core 180, outer core 280, inner cladding 380, and outer cladding 480. Further, the refractive index of the inner cladding 380 is set lower than that of the outer cladding 480 so as to form a depression A in the refractive index profile 22 of the dispersion-shifted fiber 62.

The inventors have confirmed that, when a plurality of the dispersion-shifted fibers 62 are made, their mean polarization-mode dispersion becomes 0.33 ps/(km)$^{1/2}$.

Embodiment 9

Figure 15:
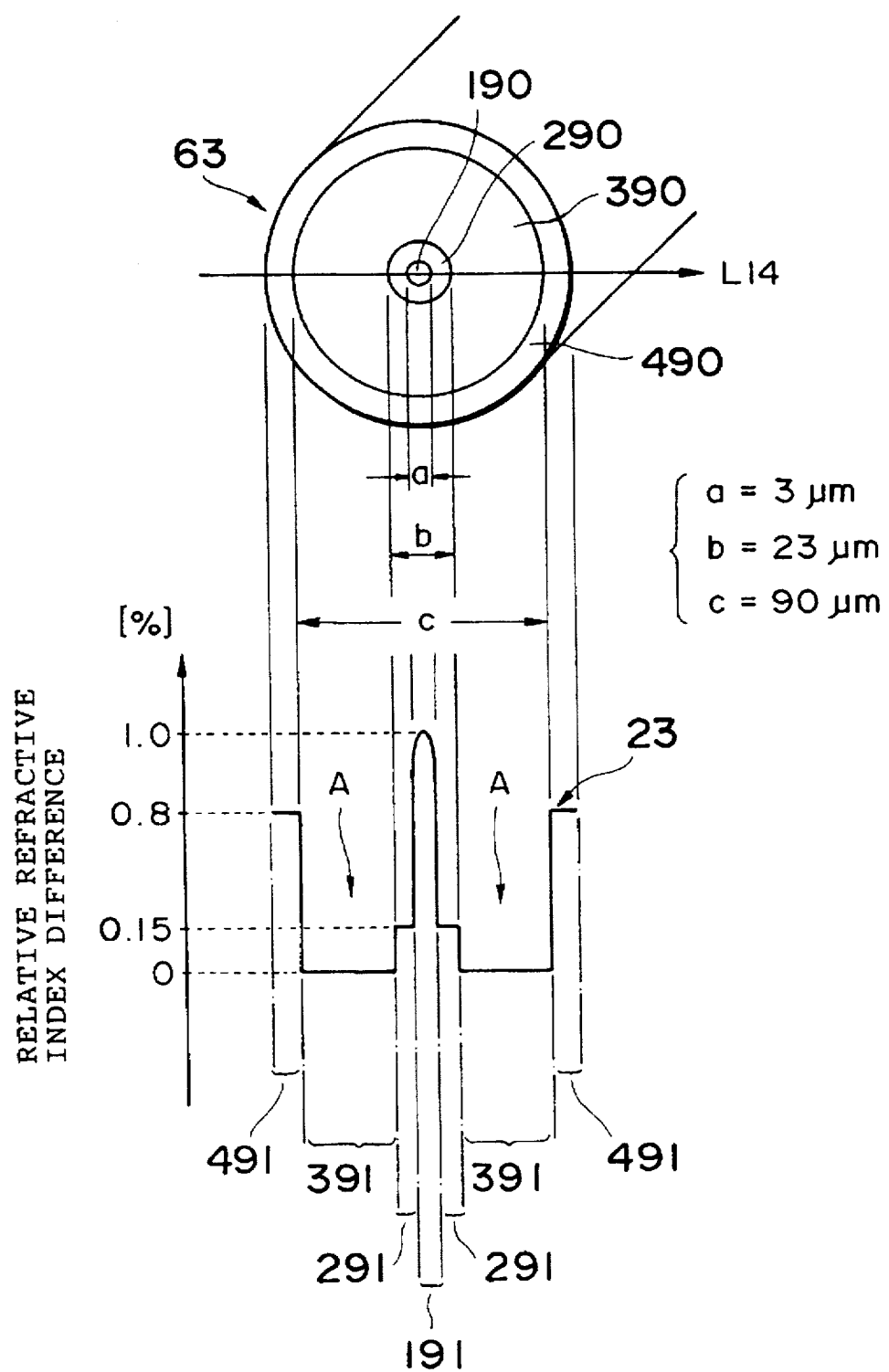
FIG. 15 is a view showing the cross-sectional structure and refractive index profile of a ninth embodiment of the dispersion-shifted fiber according to the present invention (Embodiment 9)

FIG. 15 is a view showing the cross-sectional structure and refractive index profile of the dispersion-shifted fiber according to the present invention in Embodiment 9. A dispersion-shifted fiber 63 of FIG. 15 is a single-mode optical fiber mainly composed of silica glass and comprises an inner core 190 doped with Ge and F, having a relative refractive index difference of 1.0% with respect to an inner cladding 390 and an outer diameter a of 3.0 µm; an outer core 290 disposed around the outer periphery of the inner core 190 and doped with Ge and F, having a relative refractive index difference of 0.15% with respect to the inner cladding 390 and an outer diameter b of 23 µm; the inner cladding 390 disposed around the outer periphery of the outer core 290 and doped with F, having an outer diameter c of 90 µm; and an outer cladding 490 disposed around the outer periphery of the inner cladding 390 and made of pure silica glass, having a relative refractive index difference of 0.8% with respect to the inner cladding 390 and an outer diameter of 125 µm. The zero-dispersion wavelength of the dispersion-shifted fiber 63 of this embodiment is 1,589 nm.

Here, the relative refractive index difference of each glass region in this dispersion-shifted fiber 63 is given by the above expression (1) with reference to the above-mentioned inner cladding 390.

Also, the axis of abscissa of a refractive index profile 23 shown in FIG. 15 corresponds to each position on line L14 in a cross section (plane perpendicular to the traveling direction of signal light propagated therethrough) of the dispersion-shifted fiber 63. Further, in the refractive index profile 23, regions 191, 291, 391, and 491 respectively correspond to the relative refractive index differences on the line L14 of parts in the inner core 190, outer core 290, inner cladding 390, and outer cladding 490. Further, the refractive index of the inner cladding 390 is set lower than that of the outer cladding 490 so as to form a depression A in the refractive index profile 23 of the dispersion-shifted fiber 63.

The inventors have confirmed that, when a plurality of the dispersion-shifted fibers 63 are made, their mean polarization-mode dispersion becomes 0.45 ps/(km)$^{1/2}$.

FIG. 16 shows a chart listing the zero-dispersion wavelength (nm) of each of the foregoing Embodiments 1 to 9, using the relative refractive index difference $\Delta n_3$ of the outer cladding with respect to the inner cladding and the outer diameter c of the inner cladding as parameters. Also, FIG. 17 shows a chart listing the zero-dispersion wavelength (nm) in further detail, using the relative refractive index difference $\Delta n_3$ of the outer cladding with respect to the inner cladding and the outer diameter c of the inner cladding as parameters. Here, the zero-dispersion wavelengths (nm) in the chart shown in FIG. 17 are those obtained when the outer diameter c of the inner cladding and the relative refractive index difference $\Delta n_3$ of the outer cladding with respect to the inner cladding are changed while the relative refractive index difference $\Delta n_1$ of the inner core with respect to the inner cladding, the relative refractive index difference $\Delta n_2$ of the outer core with respect to the inner cladding, the outer diameter a of the inner core, and the outer diameter b of the outer core are respectively fixed to 1.0%, 0.15%, 3 µm, and 23 µm.

Further, FIG. 18 shows a chart listing polarization-mode dispersions (ps/(km)$^{1/2}$), using the relative refractive index difference $\Delta n_3$ of the outer cladding with respect to the inner cladding and the outer diameter c of the inner cladding as parameters. Also, FIG. 19 shows a chart listing polarization-mode dispersions (ps/(km)$^{1/2}$), using the relative refractive index difference $\Delta n_3$ of the outer cladding with respect to the inner cladding and the outer diameter c of the inner cladding as parameters. Here, the polarization-mode dispersions (ps/(km)$^{1/2}$) shown in FIG. 19 are those obtained when the outer diameter c of the inner cladding and the relative refractive index difference $\Delta n_3$ of the outer cladding with respect to the inner cladding are changed while the relative refractive index difference $\Delta n_1$ of the inner core with respect to the inner cladding, the relative refractive index difference $\Delta n_2$ of the outer core with respect to the inner cladding, the outer diameter a of the inner core, and the outer diameter b of the outer core are respectively fixed to 1.0%, 0.15%, 3 µm, and 23 µm.

From the charts of FIGS. 16 and 17, it can be confirmed that the zero-dispersion wavelength in Embodiments 1 to 9 has a range of fluctuation not greater than ±10 nm from the zero-dispersion wavelength of the dispersion-shifted fiber 51 of FIG. 2, while being within the range from 1.4 µm to 1.7 µm. Also, from the charts of FIGS. 18 and 19, it can be seen that the polarization-mode dispersion in Embodiments 1 to 9 is not greater than 0.5 ps/(km)$^{1/2}$. A polarization-mode dispersion of 0.5 ps/(km)$^{1/2}$ or less is sufficiently practical for optical fibers to be applied to a long-distance large-capacity transmission for enabling optical communications for a high-speed transmission of several gigabits per second in a long distance of several ten thousand kilometers which are currently adopted or will be expected in future.

Also, from the foregoing charts, it can be seen that, when the relative refractive index difference $\Delta n_3$ of the outer cladding with respect to the inner cladding is too low or too high, its effect on the reduction of polarization-mode dispersion is lowered. The reason thereof when the relative refractive index difference $\Delta n_3$ is too low is assumed to lie in that the contribution of the inner cladding to the extension of light, which advances through the optical fiber, in the diameter direction thereof is so small that the increase in the degree of extension of light in the diameter direction caused by the inner cladding having a refractive index lower than that of the outer cladding (i.e., presence of a depression formed in the refractive index profile) is not sufficiently attained. On the other hand, the reason thereof when the relative refractive index difference $\Delta n_3$ is too high is assumed to lie in that the ratio of light existing (in the core portion) on the inner side of the inner cladding increases so much that the increase in the degree of extension of light in the diameter direction is not sufficiently attained.

Also, from the foregoing charts, it can be seen that, when the outer diameter c of the inner cladding is too small or too large, its effect on the reduction of polarization-mode dispersion is lowered. The reason thereof when the outer diameter c of the inner cladding is too small is assumed to lie in that the contribution of the inner cladding to the extension of light, which advances through the optical fiber, in the diameter direction thereof is so small that the increase in the degree of extension of light in the diameter direction caused by the inner cladding having a refractive index lower than that of the outer cladding (i.e., presence of a depression formed in the refractive index profile) is not sufficiently attained. On the other hand, the reason thereof when the outer diameter c of the inner cladding is too large is assumed to be lie in that the value of existence of the outer cladding in terms of extension of light in the diameter direction is lowered, thereby increasing the ratio of light existing (in the core portion) on the inner side of the inner cladding so much that the increase in the degree of extension of light in the diameter direction is not sufficiently attained.

Further, in order to enable optical communications for a high-speed transmission of several ten gigabits per second in a long distance of several thousand kilometers, it is necessary for the polarization-mode dispersion of the dispersion-shifted fiber applied to the optical communications to be suppressed to 0.25 ps/(km)$^{1/2}$ or less (see FIG. 19).

Figure 20:
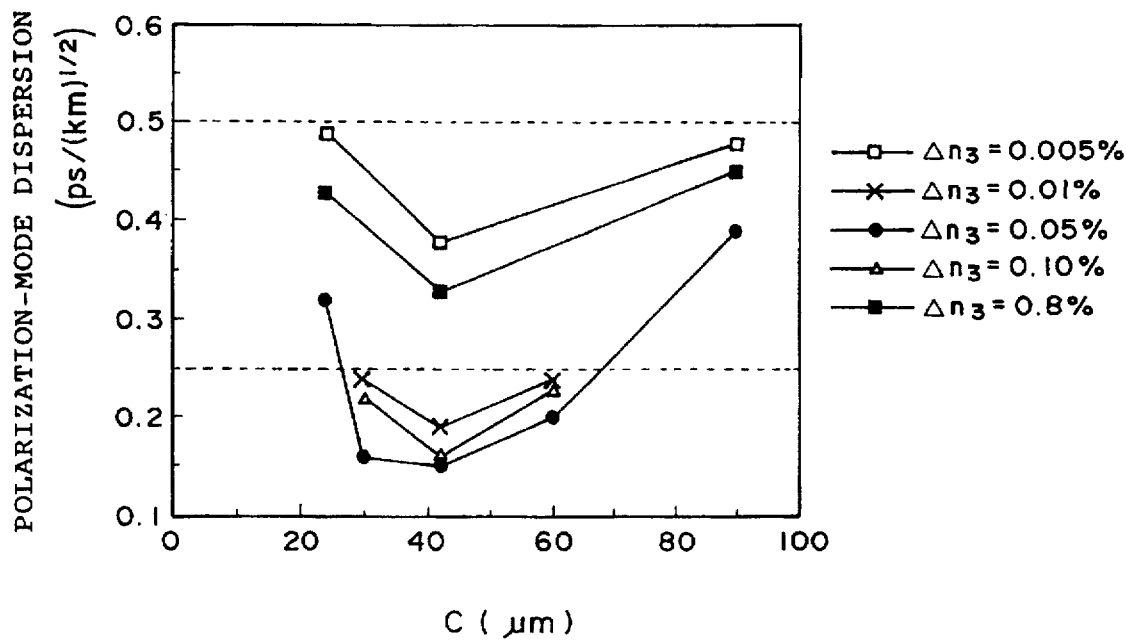
FIG. 20 is a graph showing the relationship between the outer diameter c of the inner cladding and the polarization-mode dispersion $(ps/(km)^{1/2})$ in each embodiment.
Figure 21:
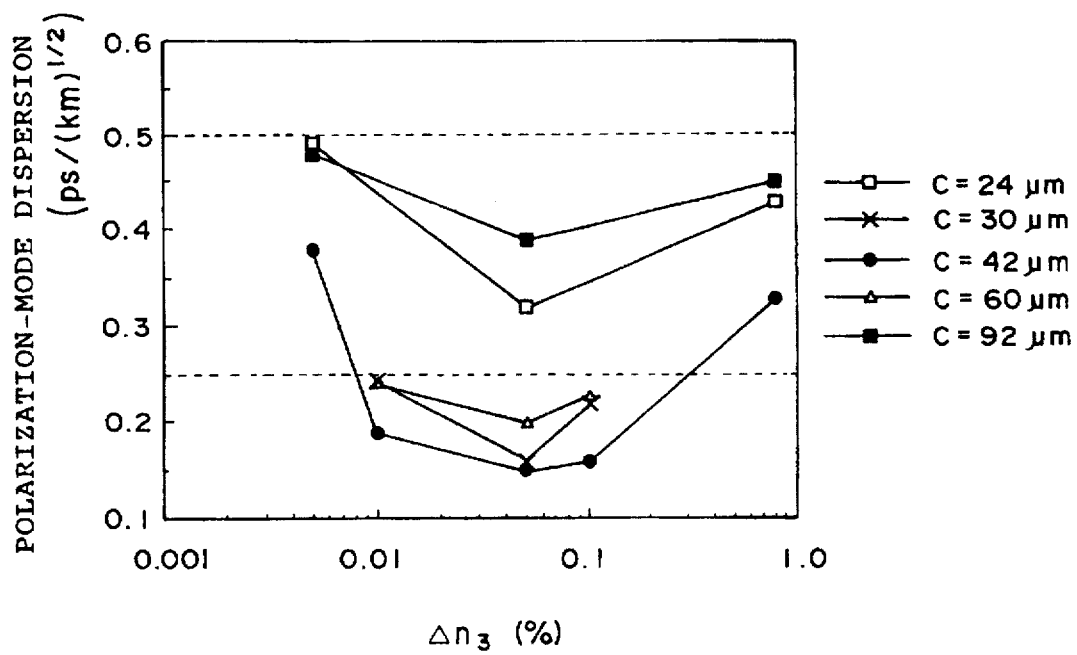
FIG. 21 is a graph showing the relationship between the relative refractive index difference $\Delta n_3$ (%) of the outer cladding with respect to the inner cladding and the polarization-mode dispersion $(ps/(km)^{1/2})$ in each embodiment.

FIG. 20 is a graph showing the relationship between the outer diameter c (µm) of the inner cladding and the polarization-mode dispersion (ps/(km)$^{1/2e}$) in dispersion-shifted fibers in which the relative refractive index difference $\Delta n_3$ of the outer cladding with respect to the inner cladding is 0.005%, 0.01%, 0.05%, 0.10%, and 0.8%, respectively. Here, among the dispersion-shifted fibers, the relative refractive index difference $\Delta n_1$ (=1.0%) of the inner core with respect to the inner cladding, the relative refractive index difference 66 $n_2$ (=0.15%) of the outer core with respect to the inner cladding, the outer diameter a (=3 µm) of the inner core, and the outer diameter b (=23 µm) of the outer core are constant. FIG. 21 is a graph showing the relationship between the relative refractive index difference $\Delta n_3$ of the outer cladding with respect to the inner cladding and the polarization-mode dispersion (ps/(km)$^{1/2}$) in dispersion-shifted fibers in which the outer diameter c of the inner cladding is 24 µm, 30 µm, 42 µm, 62 µm, and 92 µm, respectively. Also in this case, the relative refractive index difference $\Delta n_3$ (=1.0%) of the inner core with respect to the inner cladding, the relative refractive index difference $\Delta n_2$ (=0.15%) of the outer core with respect to the inner cladding, the outer diameter a (=3 µm) of the inner core, and the outer diameter b (=23 µm) of the outer core are constant among the dispersion-shifted fibers.

As can be seen from these graphs (FIGS. 20 and 21), a preferable range for attaining a polarization-mode dispersion of 0.25 ps/(km)$^{1/2}$ or less lies in:

$\Delta n_3$ of 0.01% to 0.10%; and c of 30 µm to 60 µm.

Figure 22:
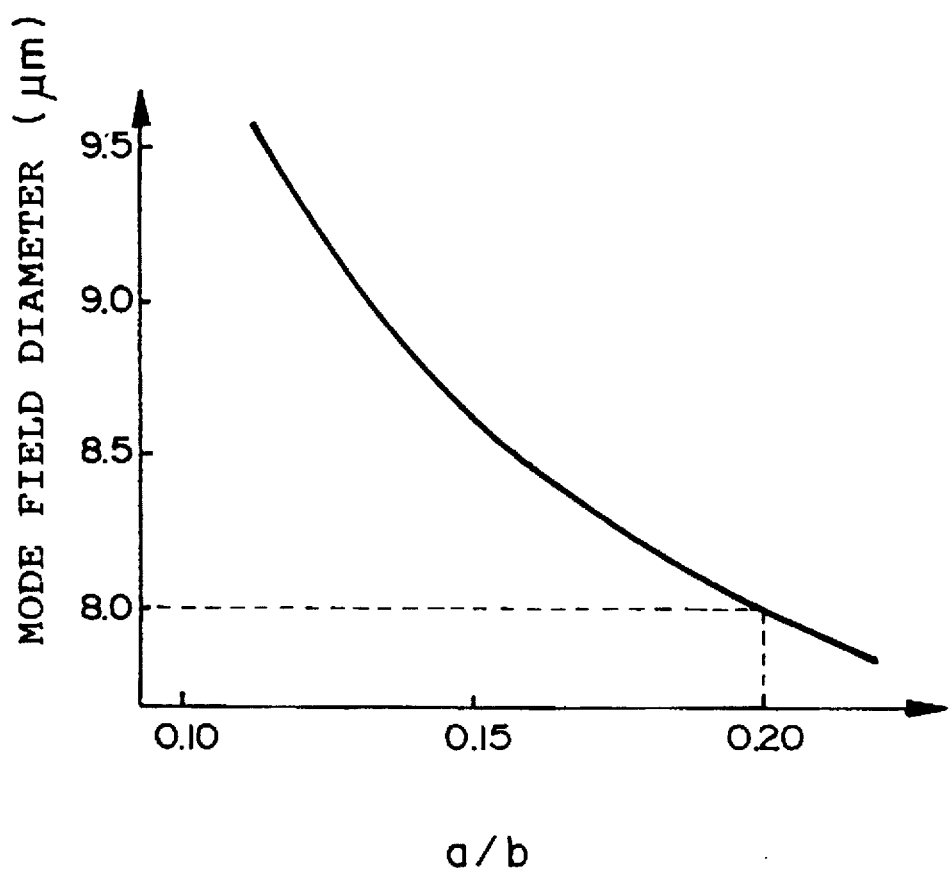
FIG. 22 is a graph showing the relationship between the ratio of the outer diameter a of the inner core to the outer diameter b of the outer core and the mode field diameter.

Further, FIG. 22 shows the relationship between the mode-field diameter (MFD) and a/b when the outer diameter b of the outer core is changed so as to yield a zero-dispersion wavelength of 1,580 nm in order to eliminate four-wave mixing which is a kind of nonlinear optical phenomenon. Here, the relative refractive index difference $\Delta n_1$ of the inner core with respect to the inner cladding, the relative refractive index difference $\Delta n_2$ of the outer core with respect to the inner cladding, and the zero-dispersion wavelength $\lambda_0$ are respectively fixed to 1.0%, 0.15%, and 1,580 nm.

In general, in order to eliminate nonlinear optical phenomena such as self-phase modulation (SPM) and cross-phase modulation (XPM), an optical fiber having a larger MFD (practically 8 µm or more) is necessary. Accordingly, as can also be seen from FIG. 22, it is necessary for the ratio of the outer diameter a of the inner core to the outer diameter b of the outer core to be set to 0.20 or less.

Here, the inventors have confirmed that the dispersion-shifted fiber according to the present invention is effective in reducing the polarization-mode dispersion not only in Embodiments 1 to 9 but also in other refractive index profiles.

Though each of the above-mentioned embodiments relates to a refractive index profile in which the refractive index distribution of the inner core in the diameter direction is formed like a bullet, the inventors have further confirmed that the dispersion-shifted fiber according to the present invention having a rectangular or triangular refractive index profile is also sufficiently effective in reducing the polarization-mode dispersion.

Without being restricted to the foregoing embodiments and examples, the present invention can be modified. For example, a dopant for increasing the refractive index added to the inner core or outer core is not limited to Ge, and phosphorus (P) or the like which is added to silica glass and thereby increases the refractive index thereof can be used as well.

Also, the dispersion-shifted fiber according to the present invention exhibits a similar effect when it has a so-called segment core structure in which the inner core has a double structure.

As explained in the foregoing, since the dispersion-shifted fiber according to the present invention adopts a "double-core+double-cladding" structure, sets the refractive index of the inner cladding lower than that of the outer cladding, and contains fluorine added to both inner and outer cores; it is effective, as a whole, in reducing the polarization-mode dispersion with respect to the light advancing through the optical fiber.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 004947/1996 filed on Jan. 16, 1996 is hereby incorporated by reference.

What is claimed is:

1. A dispersion-shifted fiber mainly comprising silica glass and having a substantially zero-dispersion wavelength within the range of 1.4 µm to 1.7 µm, said dispersion-shifted fiber comprising:

an inner core containing at least fluorine, said inner core having a first refractive index and a first outer diameter a;

an outer core disposed around an outer periphery of said inner core and containing at least fluorine, said outer core having a second refractive index lower than said first refractive index and a second outer diameter b;

an inner cladding disposed around an outer periphery of said outer core, said inner cladding having a third refractive index lower than said second refractive index; and an outer cladding disposed around an outer periphery of said inner cladding, said outer cladding having a fourth refractive index higher than said third refractive index, wherein said dispersion-shifted fiber satisfies the following conditions:

0.01% ≤ $\Delta n$ ≤ 0.10%; and

30 µm ≤ c ≤ 60 µm wherein $\Delta n$ is relative refractive index difference of said outer cladding with respect to said inner cladding, and c is outer diameter of said inner cladding.

2. A dispersion-shifted fiber according to claim 1, wherein said dispersion-shifted fiber satisfies the following conditions:

a/b ≤ 0.20; and b ≥ 15 µm.

3. A dispersion-shifted fiber according to claim 1, wherein said dispersion-shifted fiber has:

a zero-dispersion wavelength within the range of 1,560 nm to 1,600 nm;

a mode-field diameter of 8.0 µm or more;

a cutoff wavelength within the range of 1.0 µm to 1.8 µm at its length of 2 m; and a polarization-mode dispersion of 0.25 ps/(km)$^{1/2}$ or less.

4. A dispersion-shifted fiber mainly composed of silica glass, said dispersion-shifted fiber having:

a zero-dispersion wavelength within the range of 1,560 nm to 1,600 nm;

a mode-field diameter of 8.0 µm or more;

a cutoff wavelength within the range of 1.0 µm to 1.8 µm at its length of 2 m; and a polarization-mode dispersion of 0.25 ps/(km)$^{1/2}$ or less.

5. A dispersion-shifted fiber according to claim 4, wherein said dispersion-shifted fiber includes:

an inner core containing at least fluorine, said inner core having a first refractive index and a first outer diameter a;

an outer core disposed around an outer periphery of said inner core and containing at least fluorine, said outer core having a second refractive index lower than said first refractive index and a second outer diameter b;

an inner cladding disposed around an outer periphery of said outer core, said inner cladding having a third refractive index lower than said second refractive index; and an outer cladding disposed around an outer periphery of said inner cladding, said outer cladding having a fourth refractive index higher than said third refractive index.

6. A dispersion-shifted fiber according to claim 5, wherein said inner cladding contains at least a predetermined concentration of fluorine.

7. A dispersion-shifted fiber according to claim 5, wherein said dispersion-shifted fiber satisfies the following conditions:

$0.01\% \leq \Delta n \leq 0.10\%$; and $30 \ \mu m \leq c \leq 60 \ \mu m$ wherein $\Delta n$ is relative refractive index difference of said outer cladding with respect to said inner cladding, and c is outer diameter of said inner cladding.

8. A dispersion-shifted fiber according to claim 7, wherein said dispersion-shifted fiber satisfies the following conditions:

$a/b \leq 0.20$; and $b \geq 15 \ \mu m$.

* * * * *